(12) United States Patent
Yuyama et al.

(10) Patent No.: US 8,800,249 B2
(45) Date of Patent: Aug. 12, 2014

(54) MEDICAMENT DISPENSING MACHINE

(71) Applicant: YUYAMA MFG. Co., LTD, Toyonaka (JP)

(72) Inventors: Shoji Yuyama, Toyonaka (JP); Naoki Koike, Toyonaka (JP); Takafumi Imai, Toyonaka (JP); Yoshinori Kumano, Toyonaka (JP); Akira Maeda, Toyonaka (JP); Mitsuhiro Mitani, Toyonaka (JP)

(73) Assignee: Yuyama Mfg. Co., Ltd., Toyonaka-shi (JP)

( * ) Notice: Subject to any disclaimer, the term of this patent is extended or adjusted under 35 U.S.C. 154(b) by 0 days.

(21) Appl. No.: 13/750,933

(22) Filed: Jan. 25, 2013

(65) Prior Publication Data

US 2013/0133782 A1    May 30, 2013

Related U.S. Application Data

(60) Division of application No. 13/424,142, filed on Mar. 19, 2012, now Pat. No. 8,434,286, which is a continuation of application No. 13/260,723, filed as application No. PCT/JP2011/054247 on Feb. 25, 2011.

(30) Foreign Application Priority Data

Mar. 3, 2010  (JP) ................................ 2010-046405
Jan. 18, 2011  (JP) ................................ 2011-008092

(51) Int. Cl.
*B65B 43/54* (2006.01)

(52) U.S. Cl.
USPC ............... 53/284.5; 53/64; 53/266.1; 53/467; 294/902

(58) Field of Classification Search
USPC ........ 294/902; 53/284.5, 284.6, 473, 467, 52, 53/64, 266.1
See application file for complete search history.

(56) References Cited

U.S. PATENT DOCUMENTS

| | | | | | |
|---|---|---|---|---|---|
| 3,901,180 | A | * | 8/1975 | Allen et al. | 118/679 |
| 4,740,025 | A | * | 4/1988 | Nelson | 294/99.1 |
| 5,178,431 | A | * | 1/1993 | Voellmer | 294/86.4 |
| 5,769,592 | A | * | 6/1998 | Christenson | 414/408 |
| 5,863,086 | A | * | 1/1999 | Christenson | 294/106 |
| 5,938,259 | A | * | 8/1999 | Sawdon et al. | 294/116 |

(Continued)

FOREIGN PATENT DOCUMENTS

| | | |
|---|---|---|
| JP | 2006-231459 A | 9/2006 |
| JP | 2009-000291 A | 1/2009 |
| WO | 2008/156119 A1 | 12/2008 |

*Primary Examiner* — Christopher Harmon
(74) *Attorney, Agent, or Firm* — Masuvalley & Partners

(57) ABSTRACT

The medicament dispensing machine enables to use vials having various sizes and shapes without changing a part in the machine or without performing a special operation. The medicament dispensing machine contains a discharging unit that receives a vial filled with a medicament from a medicament filling means and discharges out of a vial discharging window. The discharging unit contains a vial gripping means having a pair of gripping arms that grip a vial, a body of gripping means having the vial gripping means, a moving means that moves the vial gripping means from the medicament filling means to the vial discharging window, and an orientation changing mechanism that changes the orientation of the body of gripping means. With a coordination of the movement of the body of gripping means toward the vial discharging window, the orientation changing mechanism makes the gripping arms orient to the vial discharging window.

20 Claims, 29 Drawing Sheets

(56) References Cited

U.S. PATENT DOCUMENTS

| | | | |
|---|---|---|---|
| 5,946,883 A * | 9/1999 | Yuyama et al. | 53/154 |
| 6,874,834 B2 * | 4/2005 | McIntosh et al. | 294/197 |
| 6,892,436 B2 * | 5/2005 | Yamaguchi et al. | 29/559 |
| 7,055,677 B2 * | 6/2006 | Hartness et al. | 198/803.7 |
| 7,216,758 B2 * | 5/2007 | Hartness et al. | 198/803.7 |
| 7,322,623 B2 * | 1/2008 | Morton | 294/119.1 |
| 7,357,163 B2 * | 4/2008 | Wager | 144/4.1 |
| 7,924,159 B2 * | 4/2011 | Ota et al. | 340/572.1 |
| D651,626 S * | 1/2012 | Koike et al. | D15/199 |
| 8,209,941 B2 * | 7/2012 | Osborne et al. | 53/237 |
| 8,271,138 B2 * | 9/2012 | Eliuk et al. | 700/260 |
| 2009/0067973 A1 * | 3/2009 | Eliuk et al. | 414/729 |
| 2010/0164243 A1 * | 7/2010 | Albin | 294/106 |
| 2010/0217405 A1 * | 8/2010 | Bravo Castillo | 623/64 |

\* cited by examiner

FIG. 17
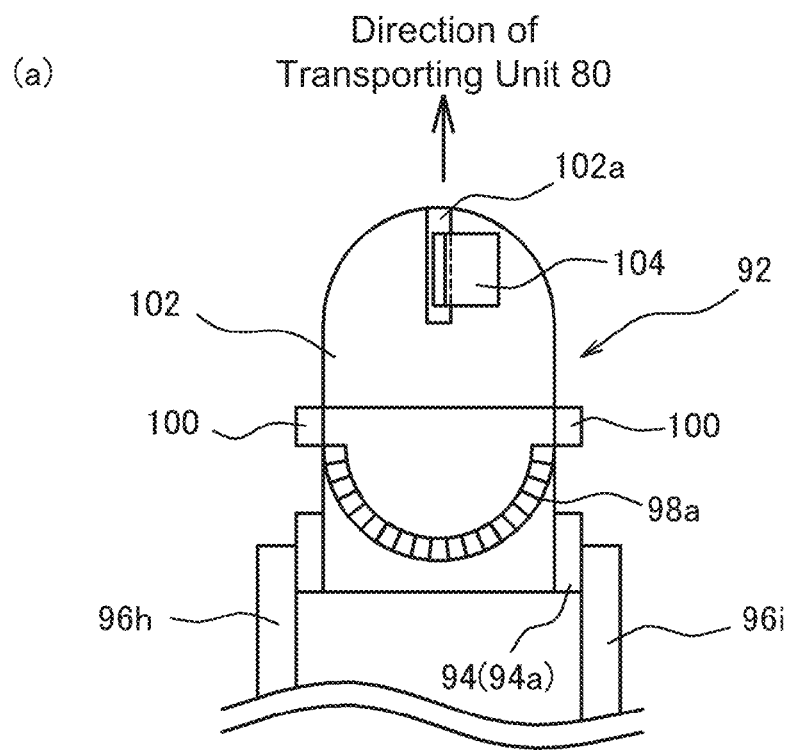
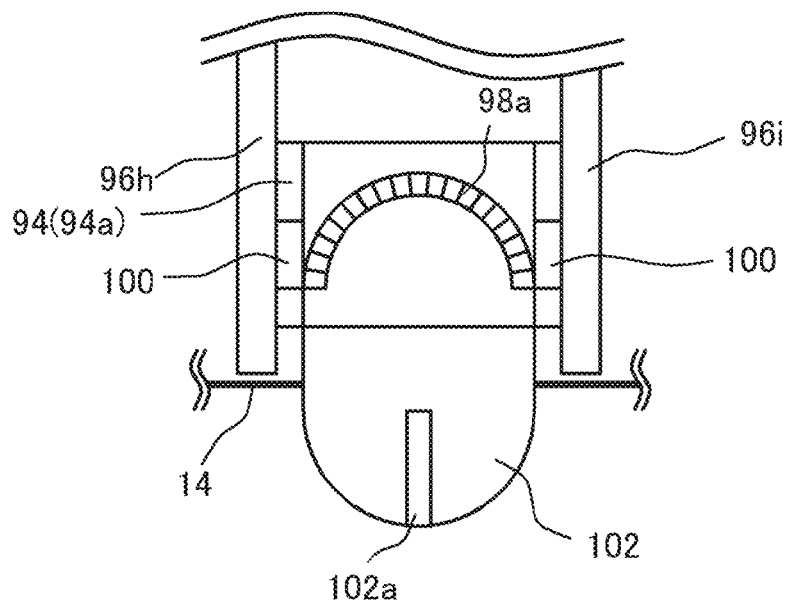

FIG. 23
(a)
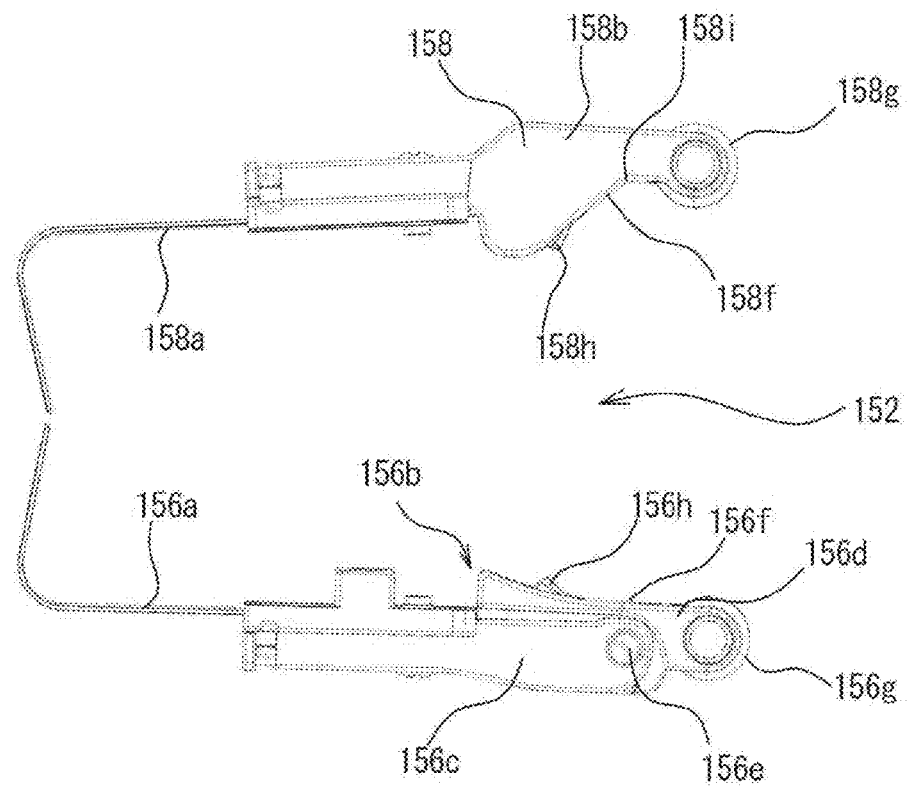
(b)
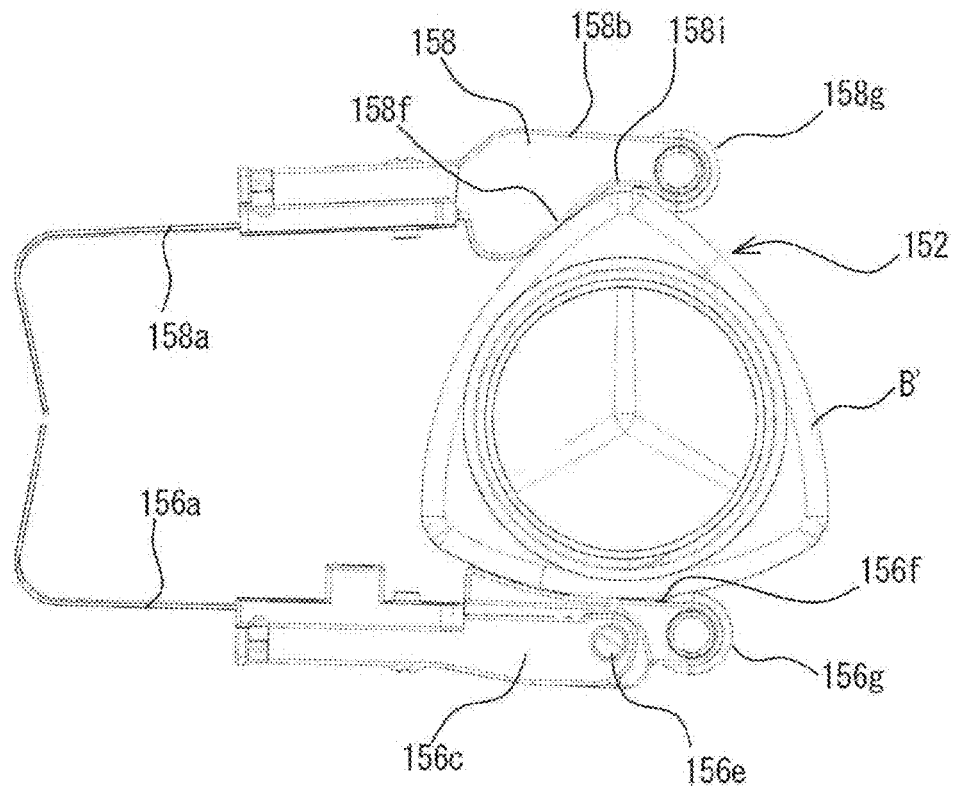

FIG. 24
(a)
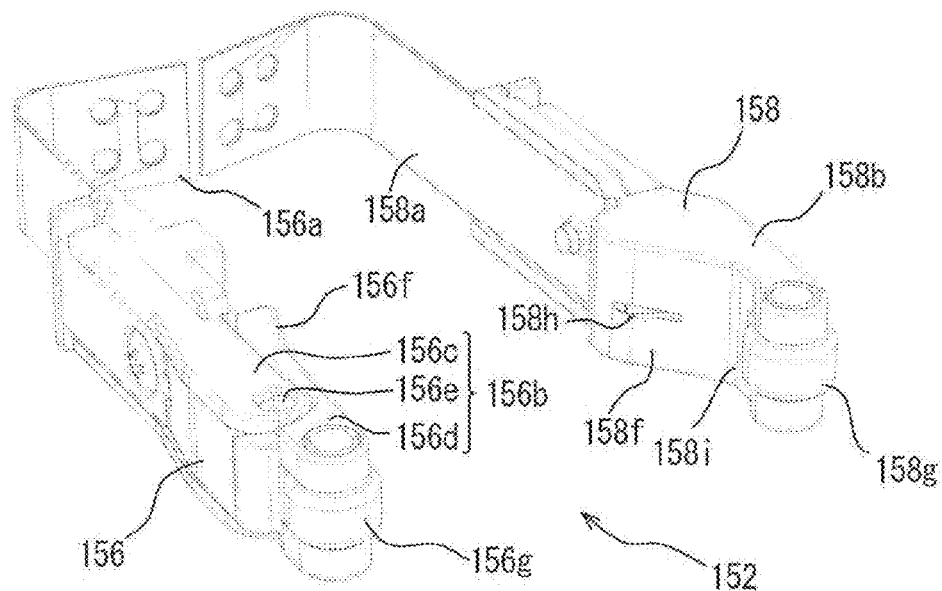
(b)
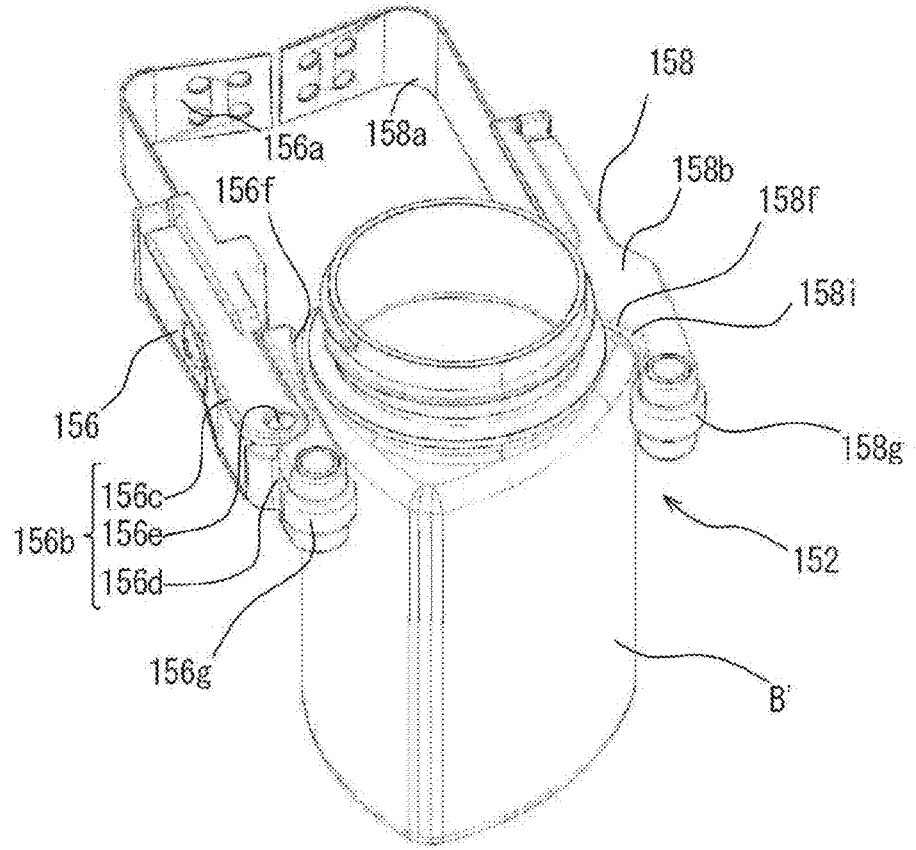

FIG. 26
(a)
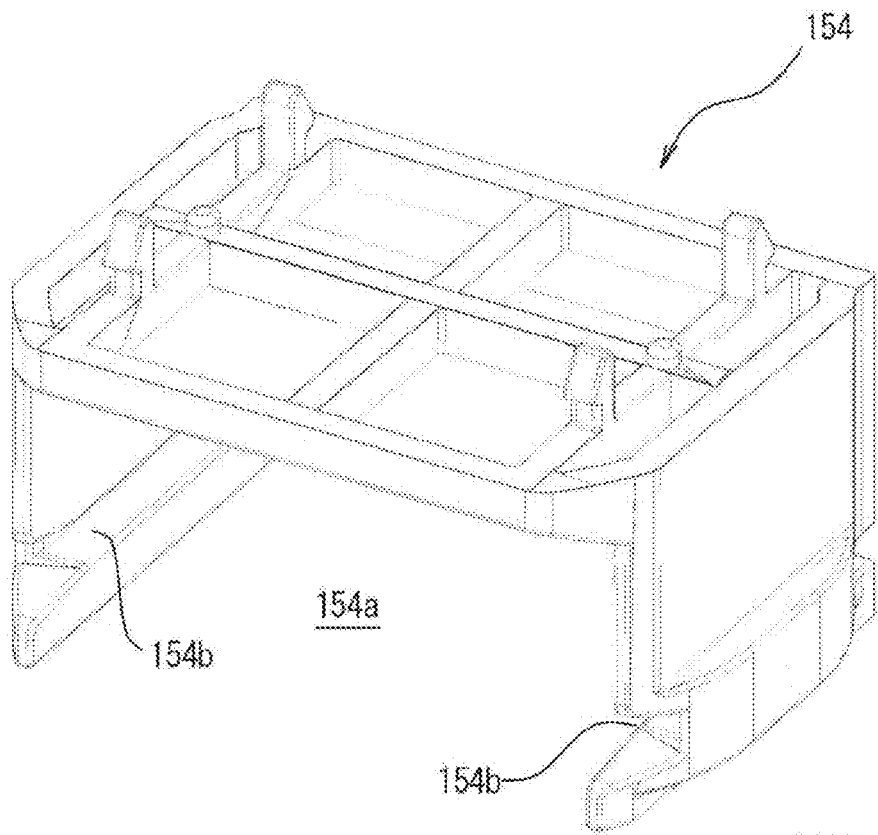
(b)
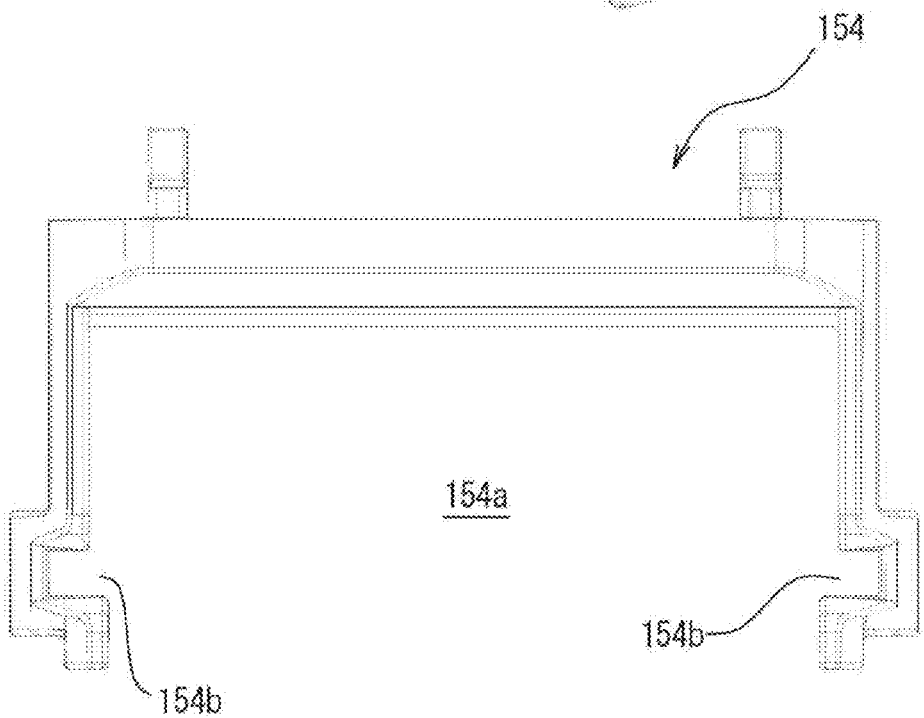

FIG. 27
(a)
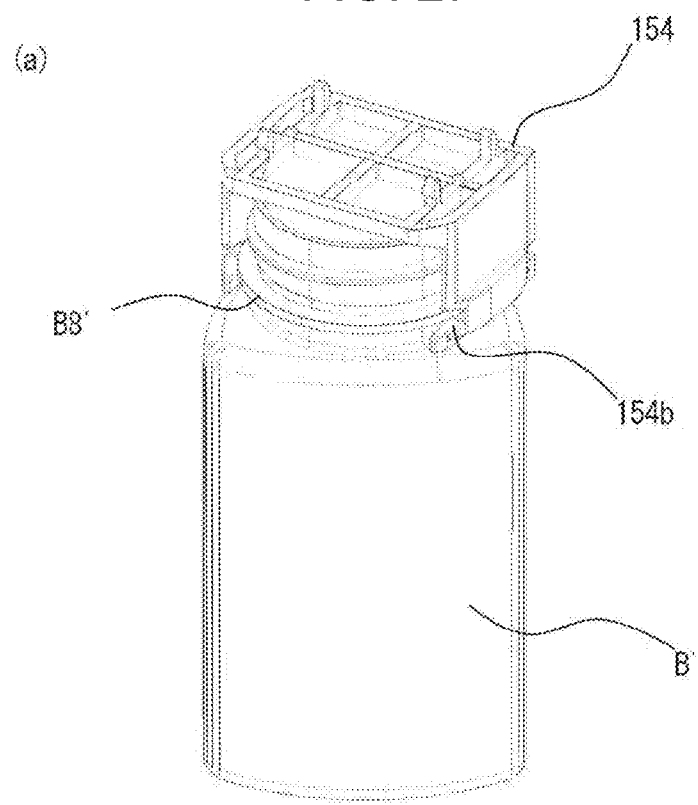
(b)
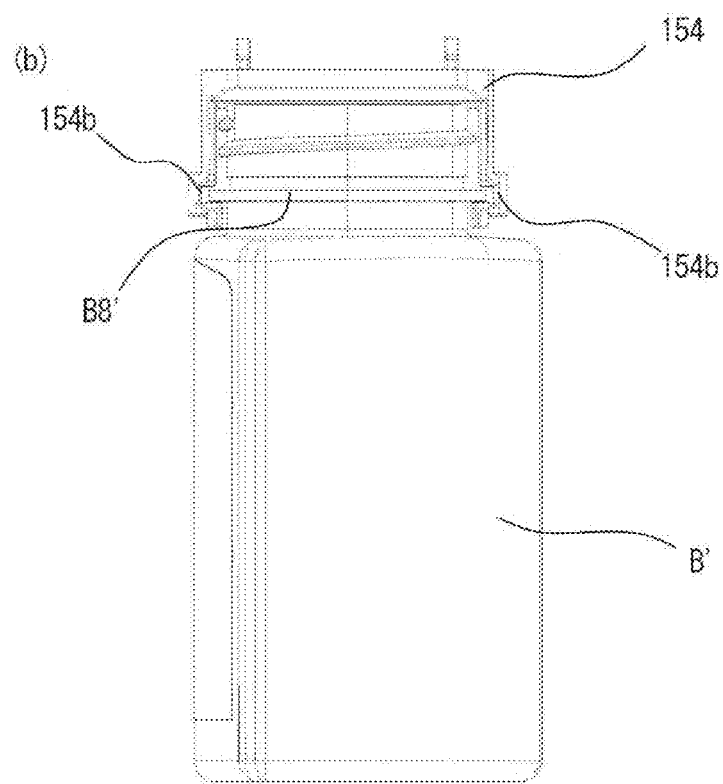

MEDICAMENT DISPENSING MACHINE

This application claims priority under 35 U.S.C. §120 and §121 as a divisional of U.S. patent application Ser. No. 13/424,142, filed Mar. 19, 2012, which claims priority under 35 U.S.C. 120 as a continuation of U.S. patent application Ser. No. 13/260,723, filed Oct. 26, 2011, which claims priority under 35 U.S.C. §371 as a national Stage application of International PCT Application Serial No. PCT/JP2011/054247, filed Feb. 25, 2011, which further claims priority under 35 U.S.C. §119 from Japanese Patent Application Serial Nos. JP2010-046405 and JP2011-008092, filed respectively Mar. 3, 2010 and Jan. 18, 2011, which are hereby expressly incorporated by reference in their entirety for all purposes.

TECHNICAL FIELD

The present invention relates to a medicament dispensing machine for filling medicaments in vials.

BACKGROUND OF THE INVENTION

According to the tablet filling device disclosed in Patent Document 1 below, there has been conventionally provided a device, in which a vial is transferred from a stocker to a position where a medicament filling means is provided. There, the medicament is filled. In this machine, after filling the vial with the medicament, it is possible to supply the vial to a vial discharging window for discharging the vial.

PRIOR ART LITERATURE

Patent Literature

Patent Document 1: Japan Patent Application Publication 2009-000291

SUMMARY OF THE INVENTION

Problem to be Solved by the Invention

In the tablet filling device mentioned above, a stopper for supporting the vial in the vial discharging window, and members such as a guide member in the machine for transporting the vial from a medicament filling means to the vial discharging window, are designed based on the size and shape of the vial used. Therefore, vials having sizes and shapes that do not match the stopper or the guide member cannot be used. It is inconvenient.

Because of such a problem, the purpose of the present invention is to provide a medicament dispensing machine that can be used without changing a part or running a special operation even after the size and shape of the vial is changed.

Means to Solve the Problem

To solve the above problem, the medicament dispensing machine of the present invention includes a medicament filling means, a vial discharging window, and a discharging unit. The medicament filling means fills an empty vial stocked in the body of the machine with a medicament. And, the vial discharging window discharges the vial filled with the medicament by the medicament filling means. The discharging unit receives the vial filled with the medicament by the medicament filling means and discharges to the vial discharging window. In addition, in the medicament dispensing machine of the present invention, the discharging unit includes a vial gripping means, a body of gripping means, a moving means and an orientation changing mechanism. The vial gripping means includes a pair of gripping arms that receives and grips the vial transferred from the side of medicament filling means. The body of gripping means supports the vial gripping means. The moving means moves the vial gripping means from the medicament filling means to the vial discharging window. And, the orientation changing mechanism changes the orientation of the body of gripping means. In the medicament dispensing machine of the present invention, the orientation changing mechanism changes the orientation of the body of gripping means such that the gripping arms face to the vial discharging window in coordination with the movement of the body of gripping means towards the vial discharging window.

The medicament dispensing machine of the present invention may include a labeling means, which paste a label on the body of the vial. The label-pasted vial can be passed to the vial gripping means and discharged through the vial discharging window. In this configuration, it is preferable to provide rotating members at the ends of the gripping arms that can freely rotate by contacting with the body of the vial.

In the medicament dispensing machine of the present invention, contact portions that contact to the body of the vial are provided on the gripping arms. In at least one of the contact portions of the gripping arms is preferably provided a vial detection means that detects the gripping arm's contact to the vial. It is preferable that the transfer of the vial coming from the medicament filling means to the gripping arms is initiated after detecting and confirming that the vial is gripped by the gripping arms by the vial detection means.

In the medicament dispensing machine of the present invention may be provided a transporting unit for transferring the vial from the medicament filling means to the discharging unit. It is preferable that the transporting unit transfers the vial to the discharging unit by moving toward and facing to the discharging unit. Further, in the medicament dispensing machine of the present invention, upon the transferring operation, if the vial is not detected by the vial detection means, it is preferable that the vial is further moved towards the discharging unit by the transporting unit.

In the medicament dispensing machine of the present invention, it is possible to open the vial discharging window in coordination with the movement of the body of gripping means towards the vial discharging window. Further, in the medicament dispensing machine of the present invention, if the vial is removed from the gripping arms projecting out of the vial discharging window, the moving means may make the vial gripping means retract in the body of the machine, and the vial discharging window may be closed.

In the medicament dispensing machine of the present invention, the discharging unit may include a pair of guides separated from each other and arranged in a horizontal direction along a discharge route from the direction of the medicament filling means to the direction of vial discharging window. The body of gripping means may be placed between the pair of guides and contact to the pair of guides to transfer the vial.

The medicament dispensing machine of the present invention may include a first engaging means and a second engaging means which can engage with the first engaging means. The first engaging means may be provided on the body of gripping means. The second engaging means may engage with the first engaging means when the body of gripping means arrives at the position where the vial is transferred.

In the medicament dispensing machine of the present invention, the pair of gripping arms can grip the body of a vial having a polygonal cross-sectional shape. It is preferable that at least one of the gripping arms has a bent portion that fits to a corner portion of the body of the vial.

In the medicament dispensing machine of the present invention, the gripping arms can grip the vial container whose body has polygonal cross sectional shape. It is preferable to provide a gripping piece on at least one of the gripping arms such that the posture of the gripping piece follows the body of the vial.

The medicament dispensing machine of the present invention may include a transporting unit to transfer the vial from the medicament filling means to the discharging unit. It is preferable that the transporting unit includes a pair of transporting arms to grip the body of the vial whose cross sectional is polygonal. It is preferable that at least one of the transporting arms is bent so that the bent fits to the corner of the body of the vial.

Effect of the Invention

The medicament dispensing machine of the present invention contains the vial gripping means, in which the vial filled with the medicament is gripped between the pair of gripping arms. Therefore, as long as the vial is within the range of a size that can be gripped, it is possible to grip any vial and move it to the vial discharging window even if various sized or shaped vials are provided in the machine.

In the medicament dispensing machine of the present invention, the orientation changing mechanism acts with the coordination of the movement of the body of gripping means towards the vial discharging window. The orientation of the body of gripping means is changed by the orientation changing mechanism such that the gripping arms orient and project to the outside of the vial discharging window. Therefore, no matter what sizes and shapes of vials are supplied, it is possible to keep holding the vial stably until the user removes the vial. Thus, sure vial dispensing to the user is possible.

In the medicament dispensing machine of the present invention, the vial is transferred to the gripping arms after the vial detection means detects and confirms that the vial is gripped by the gripping arms. Therefore, it is possible to prevent a failure of the vial delivery caused by a breakdown of the gripping arm or any other reason.

The vial detection means described above can function if it is provided on either of the gripping arms. However, it is preferable that the vial detection means are provided on both of the gripping arms. By this configuration, it is possible to stop the operation of transferring the vial when one of the gripping arms has broken. Therefore, it is possible to more surely prevent the failure of vial transfer.

In the medicament dispensing machine of the present invention, at the ends of the gripping arms are provided rotating members capable of freely rotating upon contacting with the body of the vial. Therefore, the label pasted on the body of the vial is protected from being damaged while the vial is taken out from the pair of gripping arms.

In the medicament dispensing machine of the present invention, the vial discharging window opens, coordinating with the movement of the body of gripping means towards the vial discharging window. Therefore, the vial is smoothly dispensed outside of the vial discharging window. Also, in the medicament dispensing machine of the present invention, if the vial is removed from the gripping arms projecting out of the vial discharging window, the moving means initiates operating and the vial gripping means goes back to inside of the body of the machine. Then, the vial discharging window is closed. Therefore, after the vial is removed from the gripping arms, a consecutive series of operations is carried out smoothly.

As explained above, in the medicament dispensing machine of the present invention, transfer of the vial is carried out by the vial gripping means. Unless the position of the vial gripping means is constant during the transfer of the vials, the transfer of the vial cannot not be done smoothly. And, it can be a cause of a failure. Therefore, in the medicament dispensing machine of the present invention, it is desirable to be configured so that the positioning of the body of gripping means is executed accurately.

To achieve this, in the medicament dispensing machine of the present invention, the discharging unit includes a pair of guides provided along the discharge route, and each of the guides are distantly placed from each other in a horizontal direction. Then, the body of gripping means is placed between the pair of guides such that the body of gripping means delivers the vial, with the body of gripping means in contact with the pair of guides. Therefore, in the medicament dispensing machine of the present invention, the positions where the vials are transferred from the medicament filling means to the discharging unit are consistent. And, the transfer of the vial is stabilized.

Further, by providing the first engaging means and the second engaging means, the position of the body of gripping means is determined in a left-right direction (horizontal direction) in respect to the vial discharging window because the first engaging means and the second engaging means are engaged with each other at a place where the body of gripping means arrives to transfer the vial. Therefore, by the medicament dispensing machine of the present invention, it is possible to further improve the accuracy of positioning at the vial discharging window. And, delivery failure of the vials is more effectively prevented.

In the medicament dispensing machine of the present invention, when the transporting unit transfers the vial from the medicament filling means to the discharging unit, the transporting unit further moves the vial toward the discharging unit if the vial is not detected by the vial detection means. Therefore, it is possible to further avoid a transfer error caused by a detection failure by the vial detection means.

In the medicament dispensing machine of the present invention, at least one of the two gripping arms in the discharging unit may be bent so that the bent fits to the corner of the vial. By configuring the shape of the arm like this, it is possible to stably grip the vial even if the vial has a polygonal shape.

Also, in the medicament dispensing machine of the present invention, at least one of the two gripping arms in the discharging unit may include a gripping piece that can change its posture so that it fits to the side of the vial whose body has a polygonal cross-sectional shape. This configuration further stabilizes the vial gripping.

In the medicament dispensing machine of the present invention, at least one of the two transporting arms in the transporting unit may have a bent so that the bent fits to the corner of the body of the vial. This configuration improves the stability of the vial while the vial is transported by the transporting unit.

BRIEF DESCRIPTION OF THE DRAWINGS

FIG. 17 (a) is a schematic diagram showing that the vial gripping means is positioned at a side of a transporting unit, and (b) is a schematic diagram showing that the vial gripping means is positioned at a side of the vial discharging window.

FIG. 23 (a) is a plan view showing a vial gripping means provided in the discharging unit shown in FIG. 20, and (b) is a plan view showing a state in which the vial gripping means shown in (a) grips the vial.

FIG. 24 (a) is a perspective view showing the vial gripping means provided in the discharging unit shown in FIG. 20, and (b) is a perspective view showing a state in which the vial gripping means shown in (a) grips the vial.

FIG. 26 (a) is a perspective view showing a vial holder, and (b) is a front view showing the vial holder.

FIG. 27 (a) is a perspective view showing a state in which the vial holder holds the vial, and (b) is a front view of (a).

DETAILED DESCRIPTION OF THE INVENTION

A medicament dispensing machine 10 of one embodiment of the present invention is explained, referring to drawings.

Figure 1:
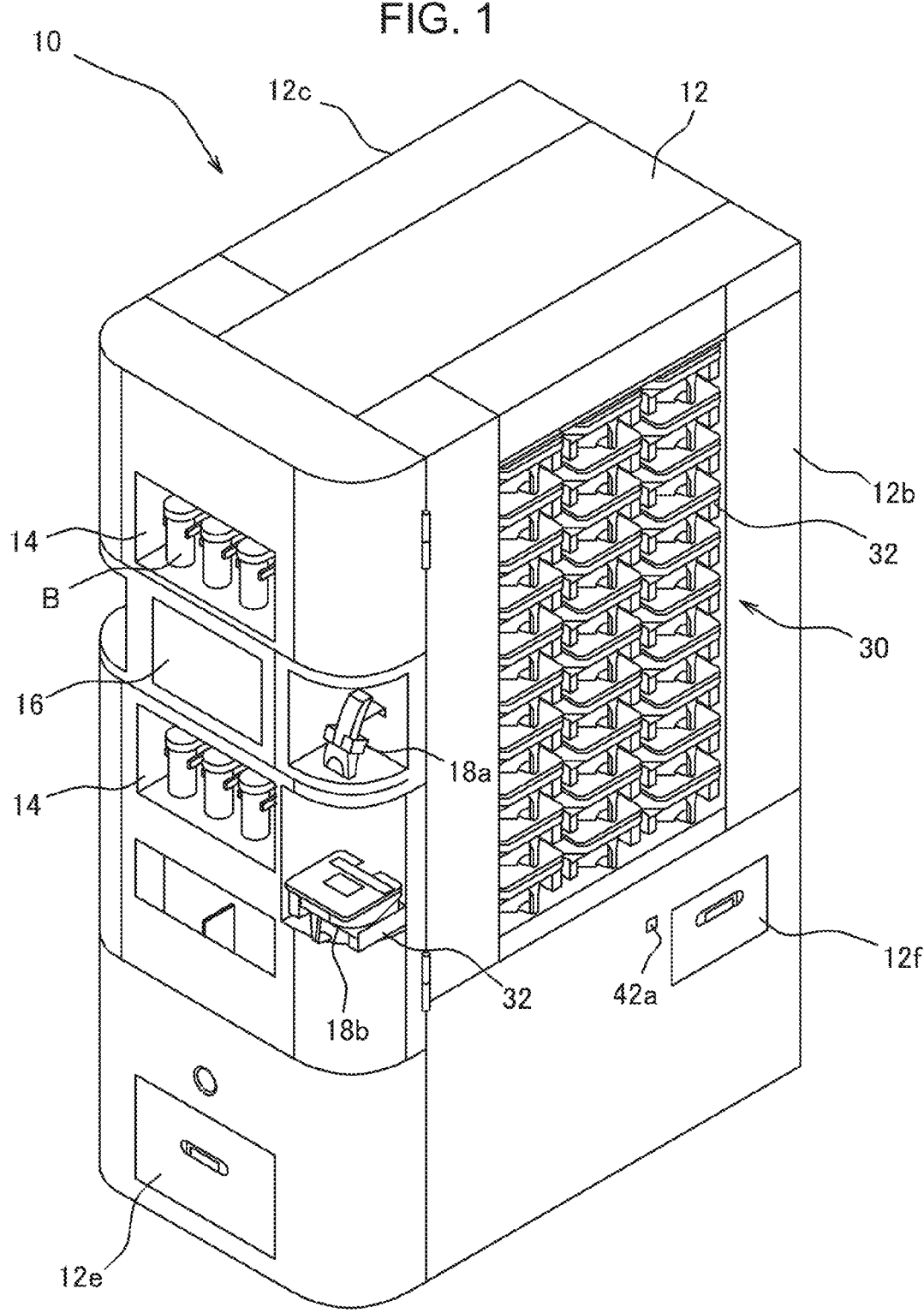
FIG. 1 is a perspective view of a medicament dispensing machine of one embodiment of the invention.
Figure 3:
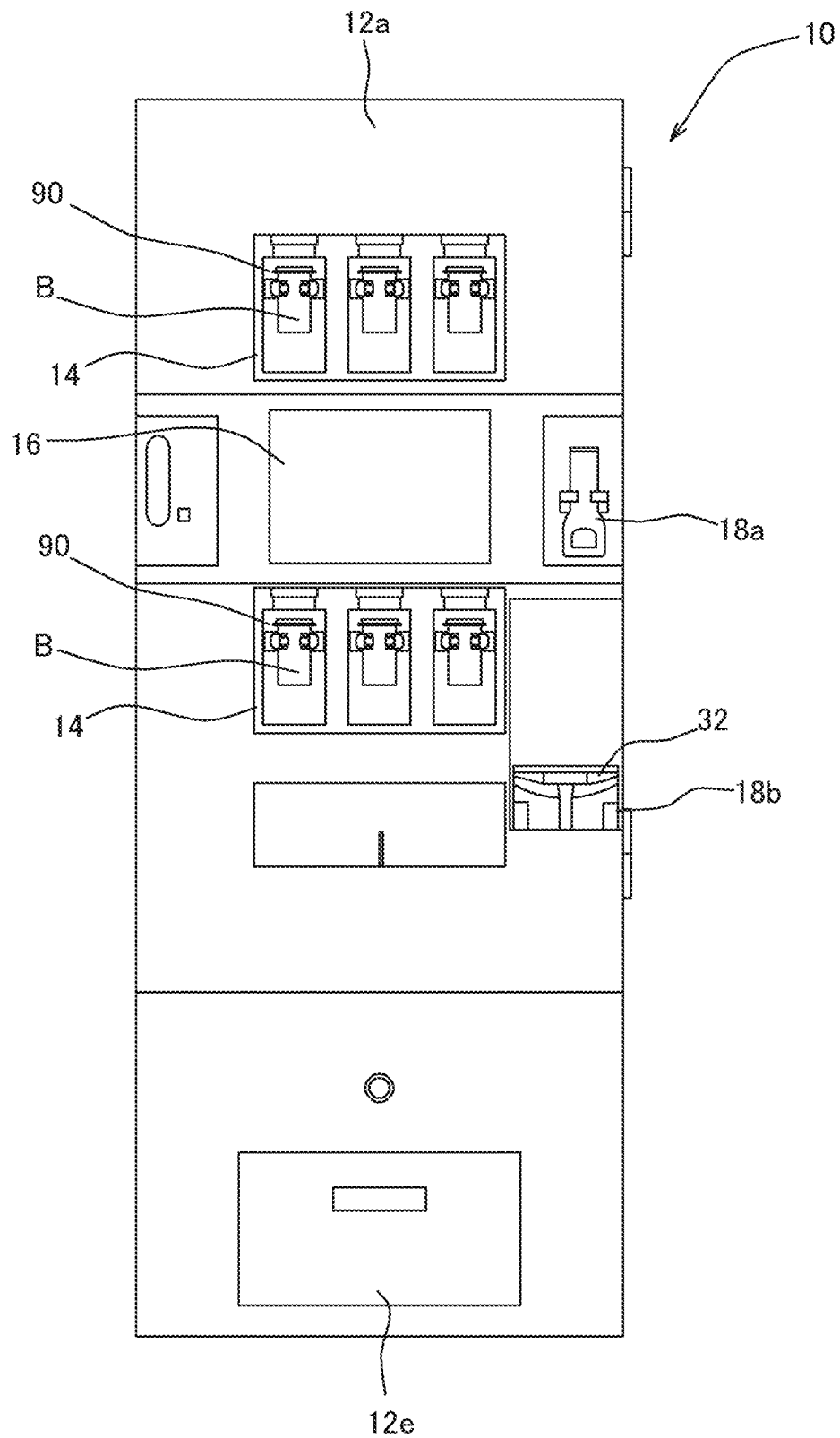
FIG. 3 is a front view of the medicament dispensing machine shown in FIG. 1.

The medicament dispensing machine 10 is a device for filling vials B with tablets (medicaments) and dispensing the medicament-filled vials. As shown in FIGS. 1 & 3, on the front side 12a of the body 12 of the medicament dispensing machine 10 are provided vial discharging windows 14a-14c for discharging the vials B filled with the medicaments, an operating panel 16, a bar code reader 18a, and a bench 18b. At the bottom of the front side 12a is provided a label unit drawer door 12e. By pulling this door, a labeling unit 70 installed in the body 12 can be taken out.

Figure 2:
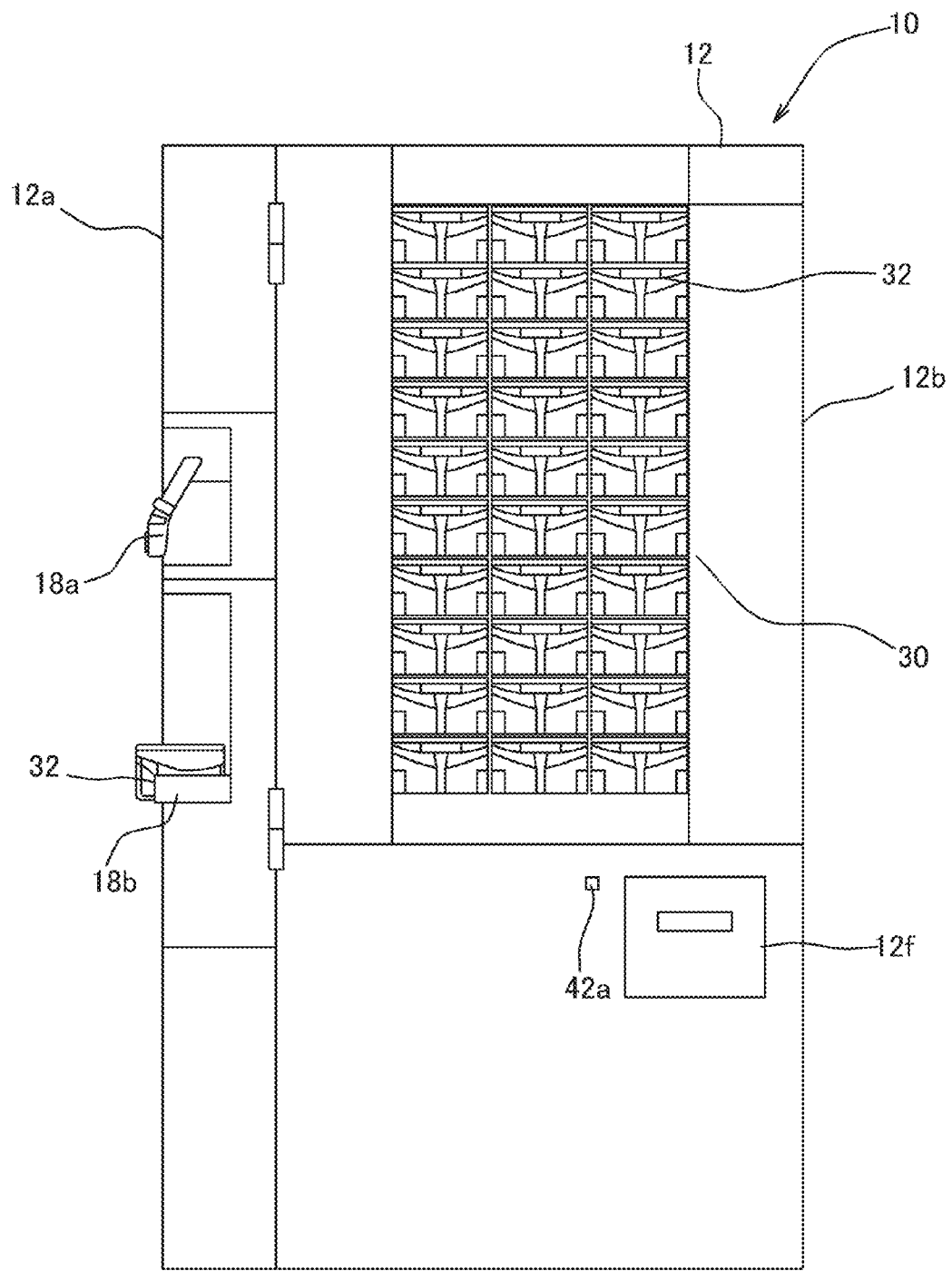
FIG. 2 is a side view of the medicament dispensing machine shown in FIG. 1.

As shown in FIGS. 1 & 2, plural tablet cassettes 32, which constitute a tablet feed unit 30 (medicament filling means) described later, are arranged in the body 12. The tablet cassettes 32 can be easily installed or removed from the sides 12b or 12c. Also, on the sides 12b and 12c is provided a drawer door 12f for supplying empty vials B. The vials B are replenished through this door and stored in a vial supply unit 40 (see FIGS. 5, 6 & 7) described later.

Figure 4:
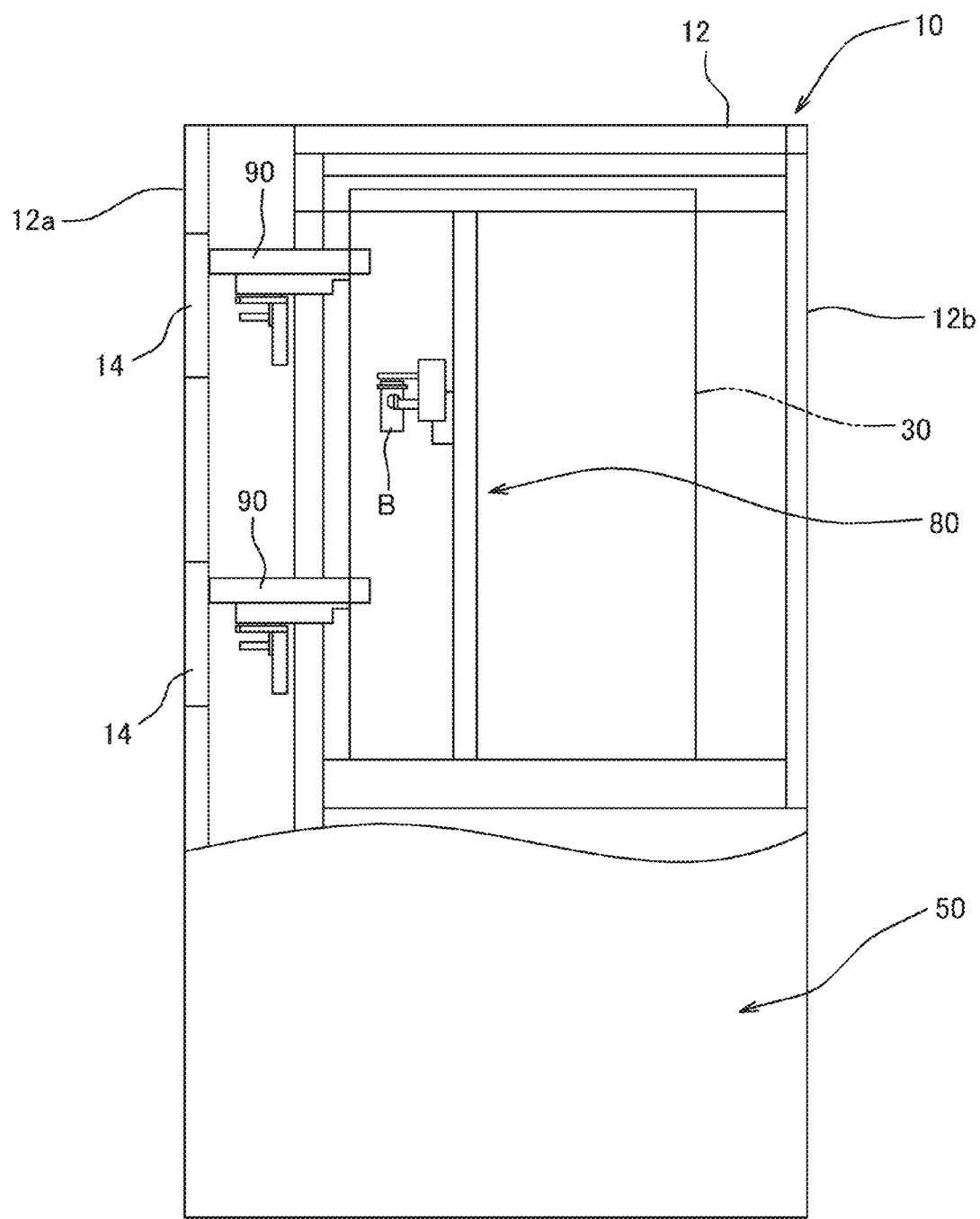
FIG. 4 is a side view showing an internal structure of the medicament dispensing machine shown in FIG. 1.
Figure 5:
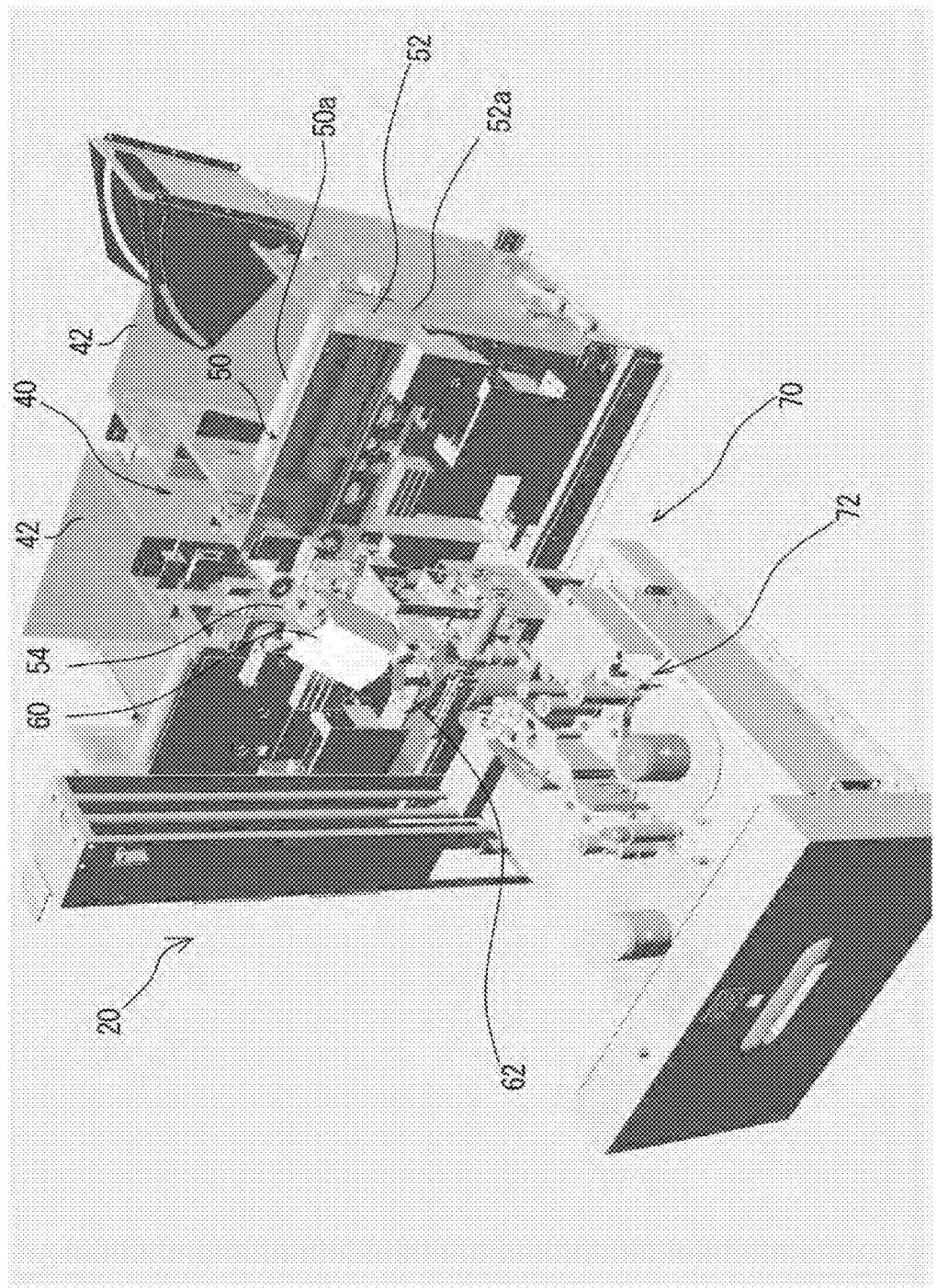
FIG. 5 is a perspective view of a vial feeding unit, a labeling unit, a vial lifter, and their nearby structure in the medicament dispensing machine shown in FIG. 1.
Figure 6:
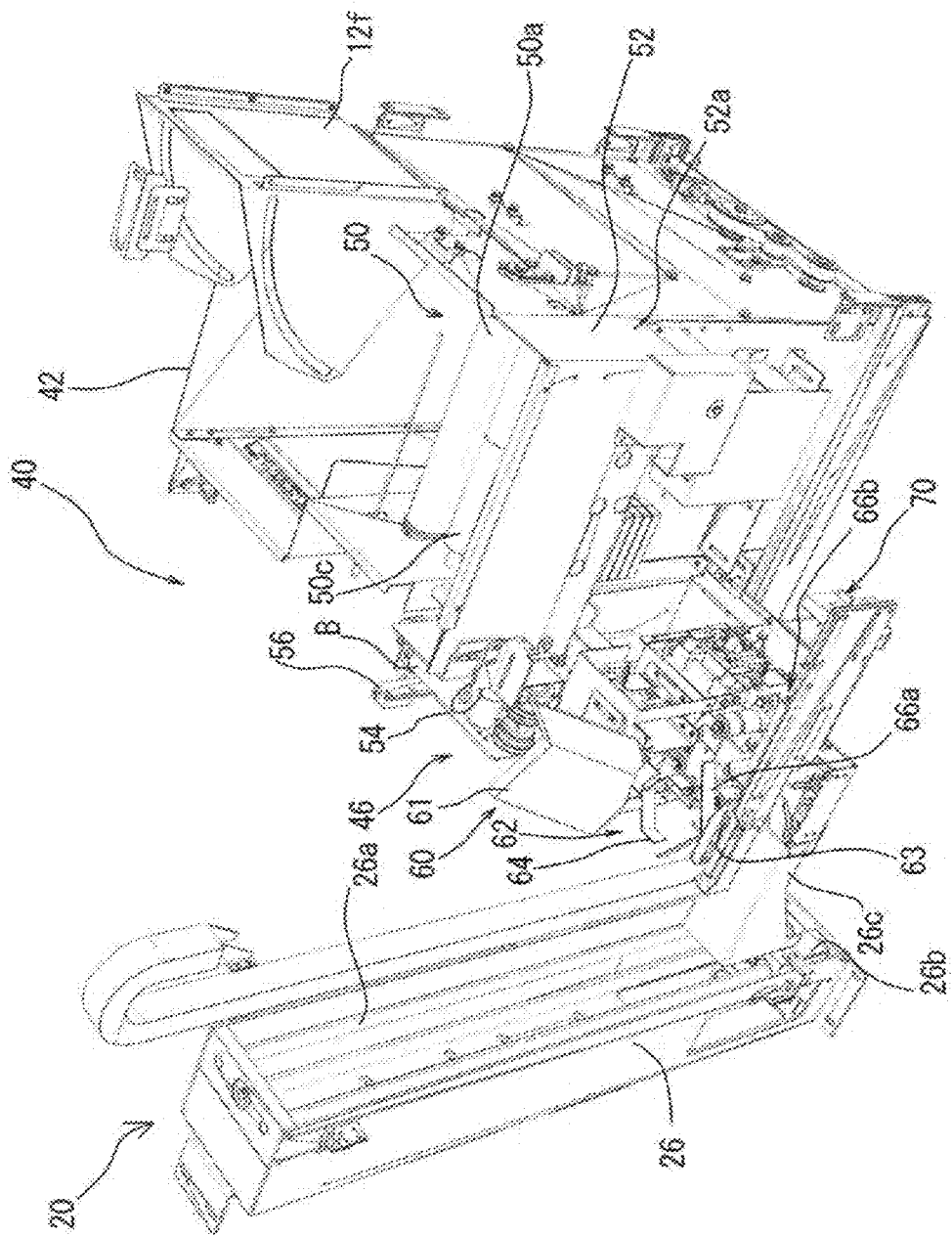
FIG. 6 is a perspective view of the vial feeding unit, the vial lifter and their nearby structure in the medicament dispensing machine shown in FIG. 1.

As shown in FIGS. 5 & 6, the medicament dispensing machine 10 contains a vial lifter 20, a vial supply unit 40 and a labeling unit 70 at the lower part of the body 12. As shown in FIG. 4, in the upper part of the body 12, the medicament dispensing machine 10 contains a transporting unit 80 for transporting the vial B prepared in the bottom part of the body 12 to the tablet supply unit 30, and a discharging unit 90 for discharging the vial B, filled with the medicaments by the tablet supply unit 30, to the user. The configuration of each part is described below.

<<Vial Supply Unit 40>>

Figure 8:
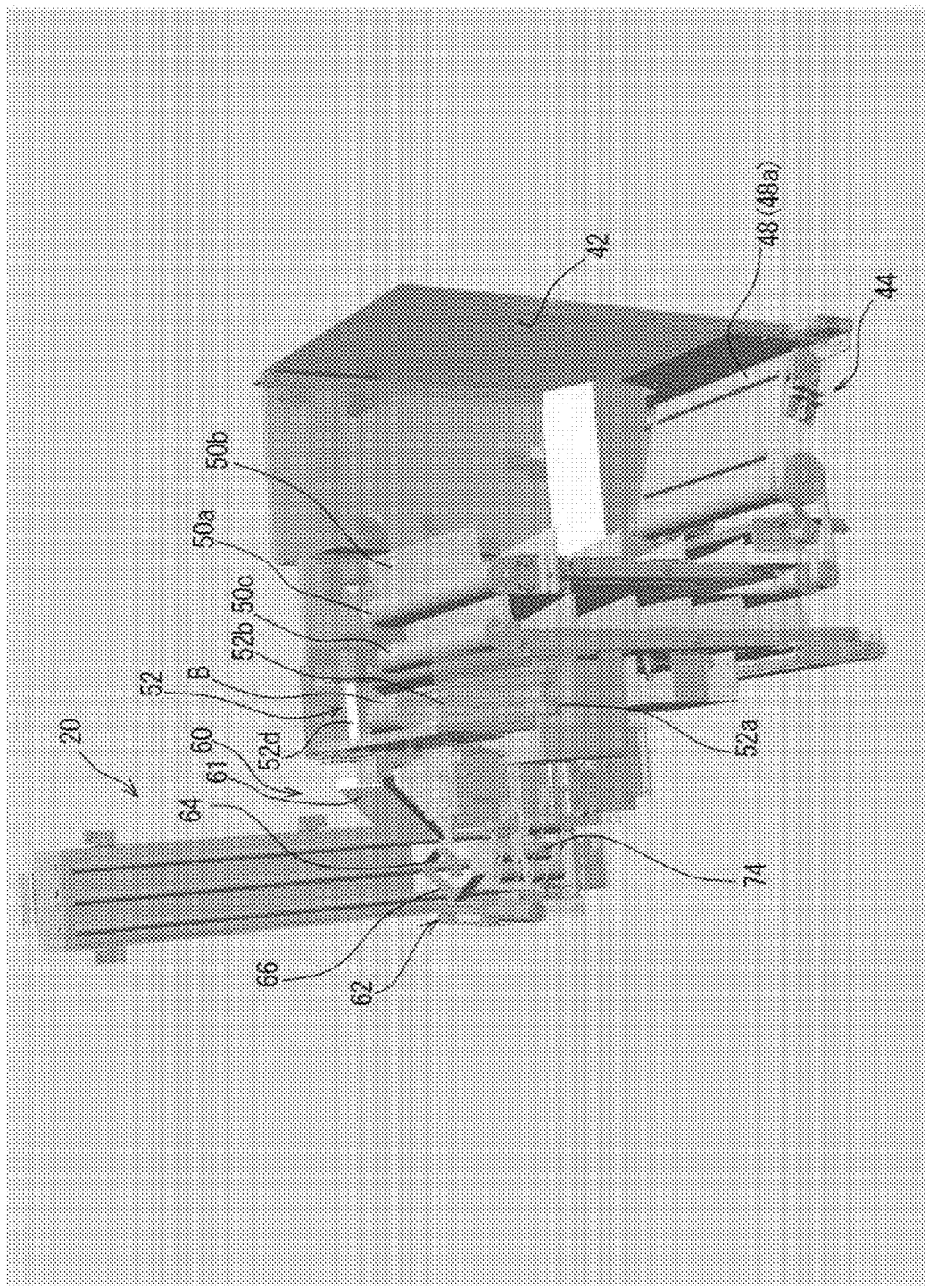
FIG. 8 is a perspective view of the vial feeding unit, the vial lifter, and their nearby structure in the medicament dispensing machine shown in FIG. 1, with some covers removed.

As shown in FIGS. 5, 6 & 8, the vial supply unit 40 contains a stocker 42, a takeout mechanism 44 and a delivery mechanism 46. The stocker 42 is rectangular box-shaped and provided for stocking the vials B. The stocker 42 is provided at the bottom part of the both sides 12b and 12c of the body 12 and in the rear side 12d of the body 12. The stocker 42 can store the vials B loaded through the drawer door 12f with their orientation at random. In this embodiment, to prevent from loading wrong-sized vials B into the stocker 42, the medicament dispensing machine 10 is equipped with a comparison means (not shown in the figure), which reads and verifies the bar code printed on the vial B or a box accommodating the vials B. If the bar code is failed to be verified, the drawer door 12f is not unlocked, and the vials B cannot be loaded. The unlocking mechanism of the drawer door 12f using the verifying means described above is not an essential configuration of the present invention.

The takeout mechanism 44 takes out the vials B randomly loaded in the stocker 42. As shown in FIG. 8, the takeout mechanism 44 contains a conveyor 48, a takeout means 50, and a transfer means 52. The conveyor 48 is constituted with an endless belt 48a. The conveyor 48 is installed in the bottom part of the stocker 42 such that it is inclined in the upper direction towards the front side 12a of the body 12. By running the conveyor 48, it is possible to move the vials B stored in the stocker 42 to the left side of the figure (to the front side 12a) in FIG. 8.

The takeout means 50 takes out and carries up the vials B gathered in the front side 12a of the conveyor 48. The takeout means 50 is provided with a drivable endless belt 50a, on which paddles 50b are fixed at a certain interval. The endless belt 50a is provided vertically along the front wall of the stocker 42. By running the takeout means 50, each paddle 50b moves in the upper direction sequentially, maintaining its horizontal posture. By the paddle 50b moving in the upper direction, the vial B located in the front side 12a of the stocker 42 is carried up and taken out from the stocker 42.

As shown in FIG. 8, the transfer means 52 contains a frame 52a and a transfer conveyor 52b. By running the transfer conveyor 52b, the transfer means 52 transfers the vial B taken out by the takeout means 50 to the delivery mechanism 46.

Figure 7:
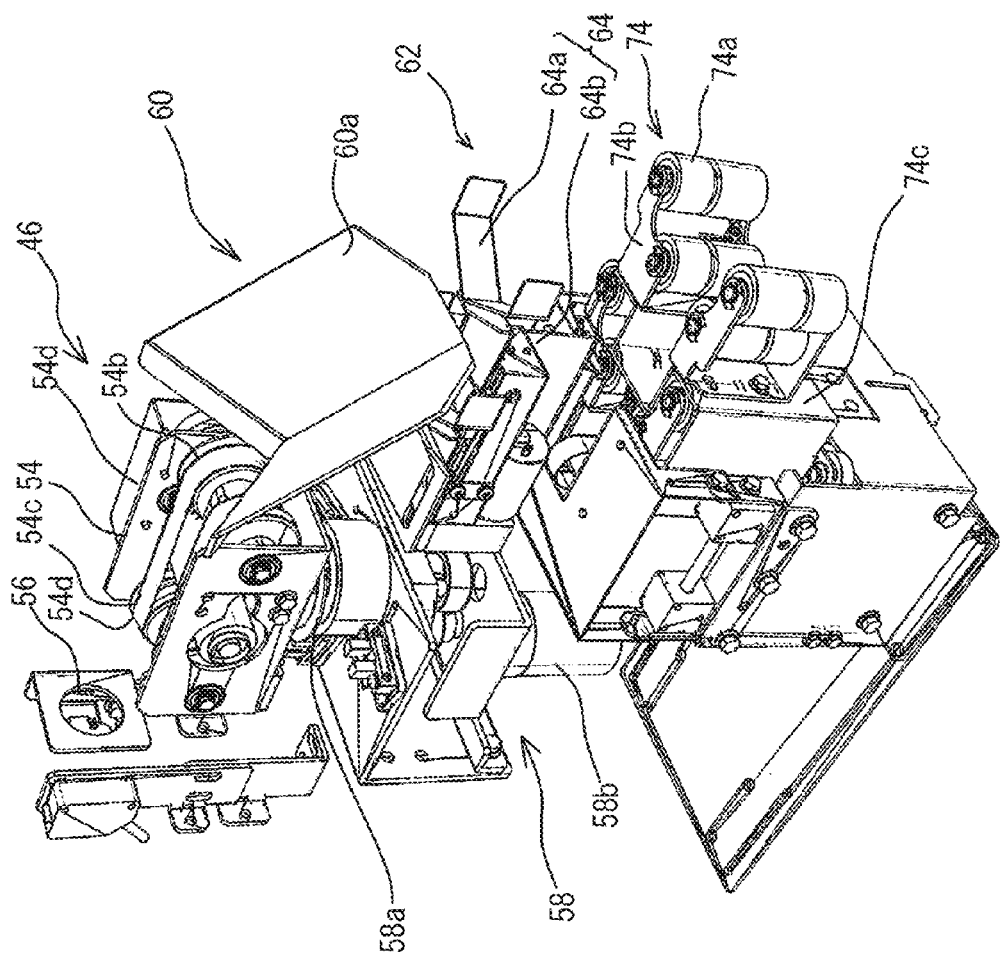
FIG. 7 is a perspective view of a delivery mechanism and its nearby structure of the medicament dispensing machine shown in FIG. 1.

The delivery mechanism 46 erects the vial B transferred by the transfer means 52. Then, the delivery mechanism 46 delivers the vial B to the next process. As shown in FIGS. 5, 6 & 7, the delivery mechanism 46 contains a first conveying means 54, a bottle direction detection means 56, a reversing mechanism 58, a bottle guide means 60, and a bottle erecting means 62.

The first conveying means 54 is provided at a location closer to the middle of the body 12 than the transfer conveyor 52b described above. The first conveying means 54 has a structure, in which an endless belt (not shown in the figure) is wound between a pair of pulleys 54b and 54c mounted on a frame 54a with a certain interval. The first conveying means 54 has a structure, in which the frame 54a is rotated by the reversing mechanism 58 provided in the bottom, and thereby the conveying direction of the vial B can be changed.

The bottle direction detection means 56 is provided on a rear side of the body 12 with respect to the first conveying means 54 described above, that is in a location opposite to a bottle guide means 60 described later. The bottle direction detection means 56 is composed of a sensor that can detect the bottom of the vial B. And, the bottle direction detection means 56 can detect whether or not the bottom of the vial B provided on the first conveying means 54 is orienting in the direction of the bottle guide means 60. By operating the reversing mechanism 58 based on the detection result brought by the bottle direction detection means 56, the delivery mechanism 46 can deliver the vial B such that the bottom side of the vial B reaches the vial lifter 20 first.

As shown in FIGS. 5-8, the bottle guide means 60 contains an inclined guide 61 made by bending a metal plate, a bottle erecting means 62, and a bottle detection means 63. The inclined guide 61 is made approximately a 'V' shape, and is placed between the first conveying means 54 and the vial lifter 20. The bottle guide means 60 is installed in an orientation sloping downwards such that the vial B can be smoothly slip down from the first conveying means 54 towards the vial lifter 20.

The bottle erecting means 62 makes upright the vial B, which was guided by the inclined guide 61 and loaded on a lifting bench 22 of the vial lifter 20 in an oblique state. The bottle erecting means 62 contains a bottle pressing means 64 and a bottle receiving means 66. The bottle pressing means 64 contains a pressing piece 64a and a drive mechanism 64b, and is provided below the first conveying means 54 and the inclined guide 61 described above. The pressing piece 64a is formed of a metal plate bended such that the shape of the metal plate fits to the shape of the body of the vial B. The drive mechanism 64b moves the pressing piece 64a in directions in which the pressing piece 64a approaches to or moves away from a bottle receiving means 66 described later.

The bottle detection means 63 is provided at a side of the bottle receiving means 66 described above. The bottle detection means 63 detects whether the vial B is loaded on the inclined guide 61. The detection result brought by the bottle detection means 63 is used as a basis for operating the bottle erecting means 62 described above.

The bottle receiving means 66 is arranged at a position facing to the bottle pressing means 64 with a certain gap. The bottle receiving means 66 receives and supports the body of the vial B, which is pressed by the bottle pressing means 64, from the opposite side of the bottle pressing means 64. The bottle receiving means 66 contains a bottle receiving unit 66a formed by bending a metal plate, and a receiving unit drive means 66b for rotating the bottle receiving unit 66a. The receiving unit drive means 66b can switch the states of the bottle receiving unit 66a between a horizontal state and an erected state, in the former of which the bottle receiving unit 66a can receive the vial B.

<<Labeling Unit 70>>

The labeling unit 70 contains a label printer 72 (label pasting means) and a pusher 74. The label printer 72 prints and pastes a label on the outer periphery of the vial B. The label printer 72 is located in a place adjacent to the front side 12a of the supply means 60.

Pusher 74 contacts to and pushes the body of the vial B, which is sitting on the lifting bench 22 in an erected state, towards the label printer 72 that is located in front of the supply means 60. The pusher 74 is located below the bottle pressing means 64 described above. The pusher 74 contains four pressing rollers 74a, a roller frame 74b and a drive mechanism 74c. The pressing rollers 74a press the vial B. The roller frame 74b pivots the pressing rollers 74a. And, the drive mechanism 74c moves the roller frame 74c in frontward and backward directions, more specifically, in directions of approaching to or moving a way from the vial lifter 20.

<<Vial Lifter 20>>

As shown in FIGS. 5 & 6, the vial lifter 20 contains a lifting bench 22 for accommodating the vial B supplied from the supply means 60, and a lifting mechanism 26 for lifting the lifting bench 22. The lifting bench 22 loads the vial B received from the first conveying means 54 of the delivery mechanism 46 in an approximately erected state. And, the lifting bench 22 moves in upward and downward directions in a space formed between the bottle pressing means 64 and the bottle receiving means 66 described above. The vial lifter 20 can securely hold and support the bottom of the vial B loaded on the lifting bench 22 in the erected state.

As shown in FIGS. 5 & 6, the lifting mechanism 26 is provided in a location adjacent to the lifting bench 22. The lifting mechanism 26 contains a guide rod 26a extending in upper and lower directions, and a lifting block 26b attached to the guide rod 26a. The lifting bench 22 is installed on the lifting block 26b via an arm 26c. Therefore, if a power is transmitted to the lifting block 26b from a power source that is not shown in the drawing, the lifting bench 22 slides in upward and downward directions along the guide rod 26a with the lifting block 26. After pasting a label on the vial B with the labeler 70 provided at the bottom of the body 10, by moving the lifting bench 22 in the upward direction, the vial B placed on this lifting bench 22 is transferred to the transporting unit 80.

<<Tablet Supply Unit 30>>

As shown in FIGS. 1 & 2, the tablet supply unit 30 is provided on both sides 12b and 12c of the body 12 in a location higher than the location where the vial supply unit 40 explained above is located. The tablet supply unit 30 contains tablet cassettes 32, which dispense stored tablets. The medicaments dispensed from the tablet cassettes 32 enter the space between the tablet supply units 30 and 30 provided on both sides 12b and 12c of the body 12.

<<Transporting Unit 80>>

The transporting unit 80 can deliver the vial B received from the vial lifter 20 into the space between the tablet supply units 30 and 30 provided on both sides (sides 12b and 12c) of the body 12 with vial B's opening facing upward. By moving the vial B to the dispensing port (not illustrated) of the tablet cassette 32, which is filled with the medicament to be dispensed, by the transporting unit 80, the vial B is filled with the medicament. The transporting unit 80 also transfers the vial B filled with the tablet from the tablet supply unit 30 to the discharging unit 90.

<<Discharging Unit 90>>

Figure 9:
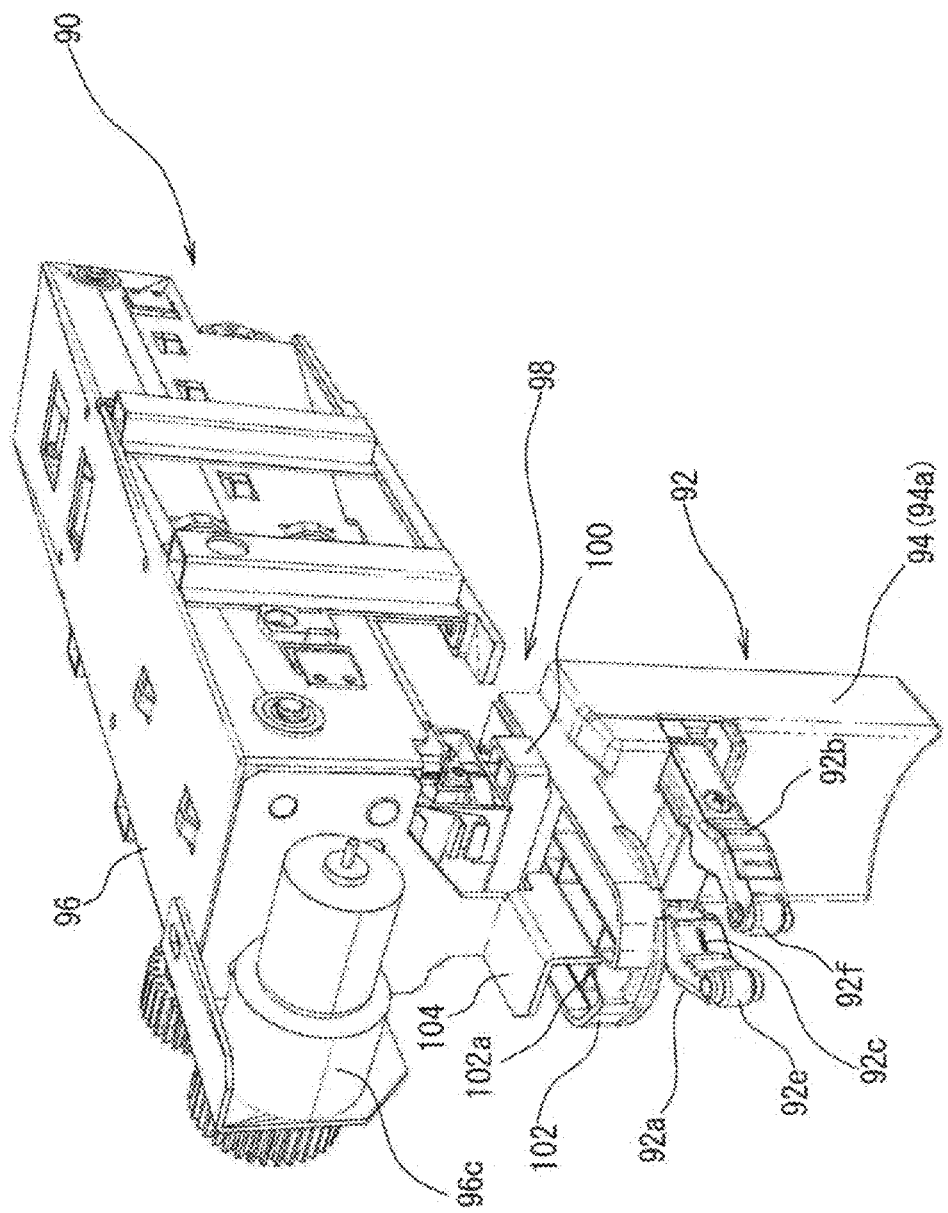
FIG. 9 is a perspective view of a discharging unit.
Figure 10:
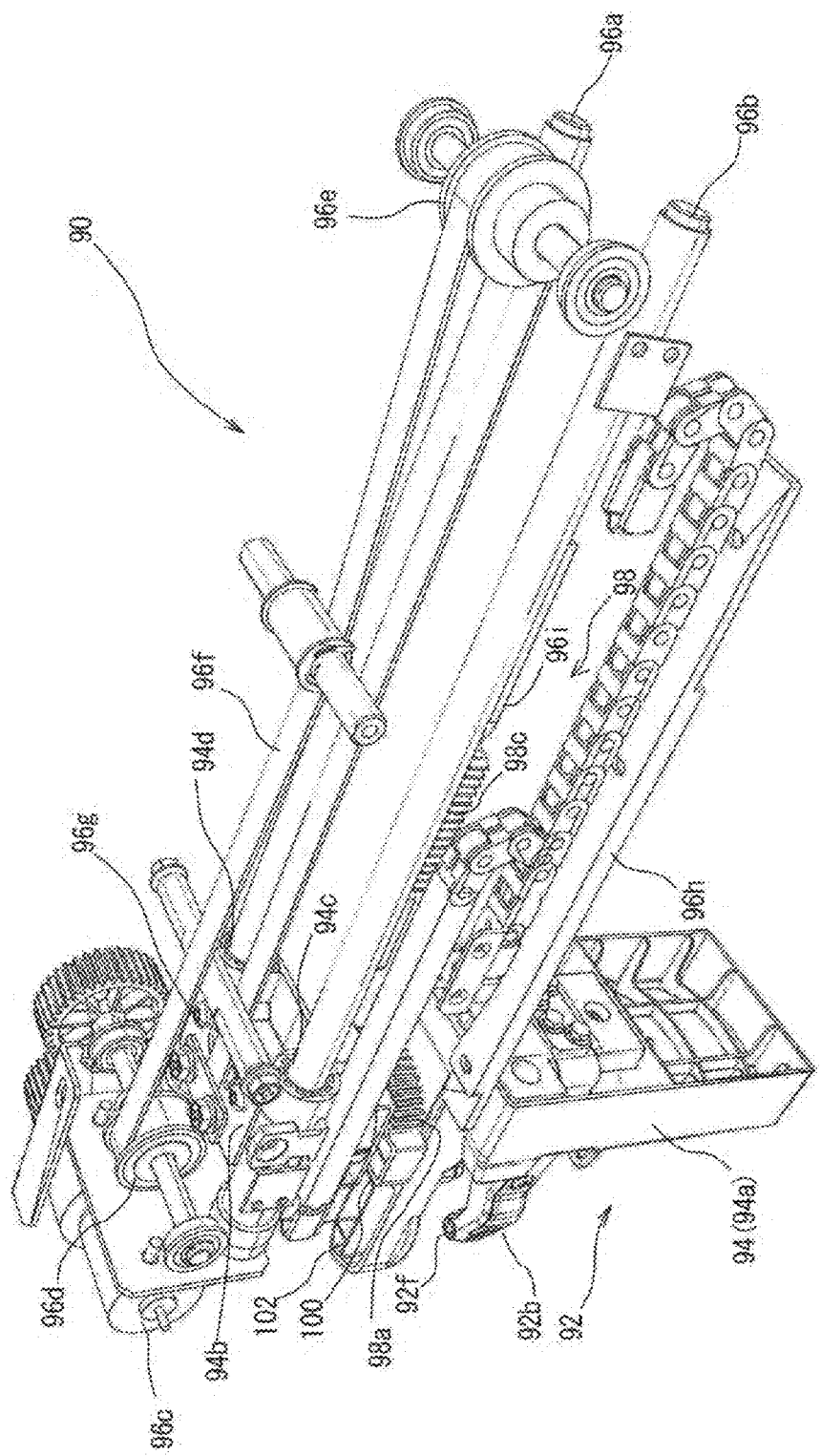
FIG. 10 is a perspective view of the discharging unit depicting the internal structure of a moving means.

The discharging unit 90 supplies and discharges the vial B transferred from the transporting unit 80 to the vial discharging window 14. As shown in FIGS. 9 & 10, the discharging unit 90 contains a vial gripping means 92, a body of gripping means 94, a moving means 96, and an orientation changing mechanism 98. The vial gripping means 92 receives and grips the vial B, filled with the medicament by the tablet supply unit 30, from the transporting unit 80. The vial gripping means 92 contains a pair of gripping arms 92a and 92b.

The gripping arms 92a and 92b are the parts having arm shapes. The gripping arms 92a and 92b are installed on the body of gripping means 94 so as to be symmetric in left and right with respect to the body of gripping means 94. In the state where the gripping arms 92a and 92b are not gripping the vial B, the gap between the gripping arms 92a and 92b is smaller than the outer diameter of the smallest vial of the vials B expected to be used. The gripping arms 92a and 92b can bend in the direction in which the gap between them widens. Therefore, when the vial B is inserted between the gripping arms 92a and 92b, the gripping arms 92a and 92b bend in the direction in which they become more distant from each other. Thereby, the vial B is tightly gripped.

Contact type switches 92c and 92d are provided on the gripping arms 92a and 92b on the surface facing inside, more specifically the portion (contact portion) that contacts to the body of the vial B when the gripping arms 92a and 92b grip the vial B. These switches 92c and 92d are used for detecting whether the gripping arms 92a and 92b have gripped the vial B. The switches 92c and 92d are electrically connected to a controller (not shown in the drawing) of the medicament dispensing machine 10.

When the vial B is gripped and the body of the vial B is in contact with the switches 92c and 92d, both the switches 92c and 92d become ON, and it is confirmed that the vial B is gripped. In the case either of the gripping arms 92a and 92b is broken and cannot grip the vial B, either of the switches 92c and 92d will not become ON and the existence of the vial B will not be detected. In such a situation, if the vial B is transferred to the gripping arms 92a and 92b, the vial B will not be securely gripped. It is expected that the vial B may fall inside of the machine and the medicaments may be spilled. Therefore, in this embodiment, upon detections by both the switches 92c and 92d, the receiving of the vial B from the transporting unit 80 is confirmed. Although such a control mechanism is not essential in the present invention, it is preferable to configure some means to avoid the failure of receiving the vial B.

Figure 12:
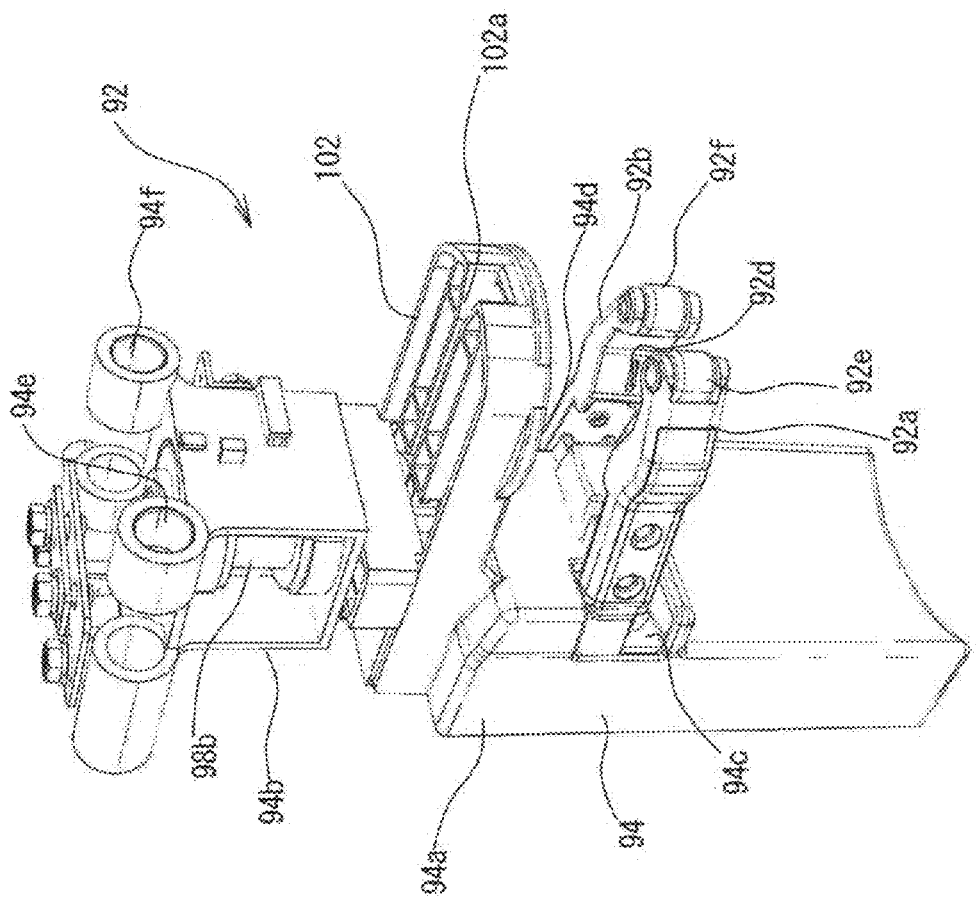
FIG. 12 is a perspective view of the vial gripping means viewed from a front side.
Figure 13:
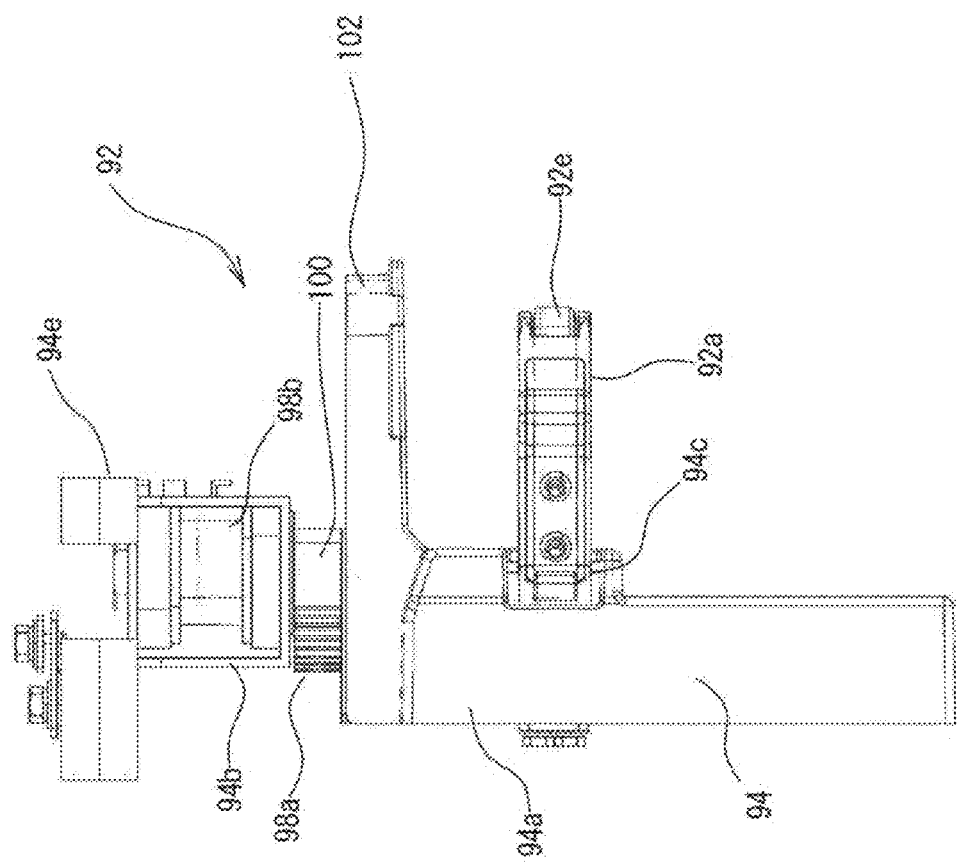
FIG. 13 is a side view of the vial gripping means.
Figure 14:
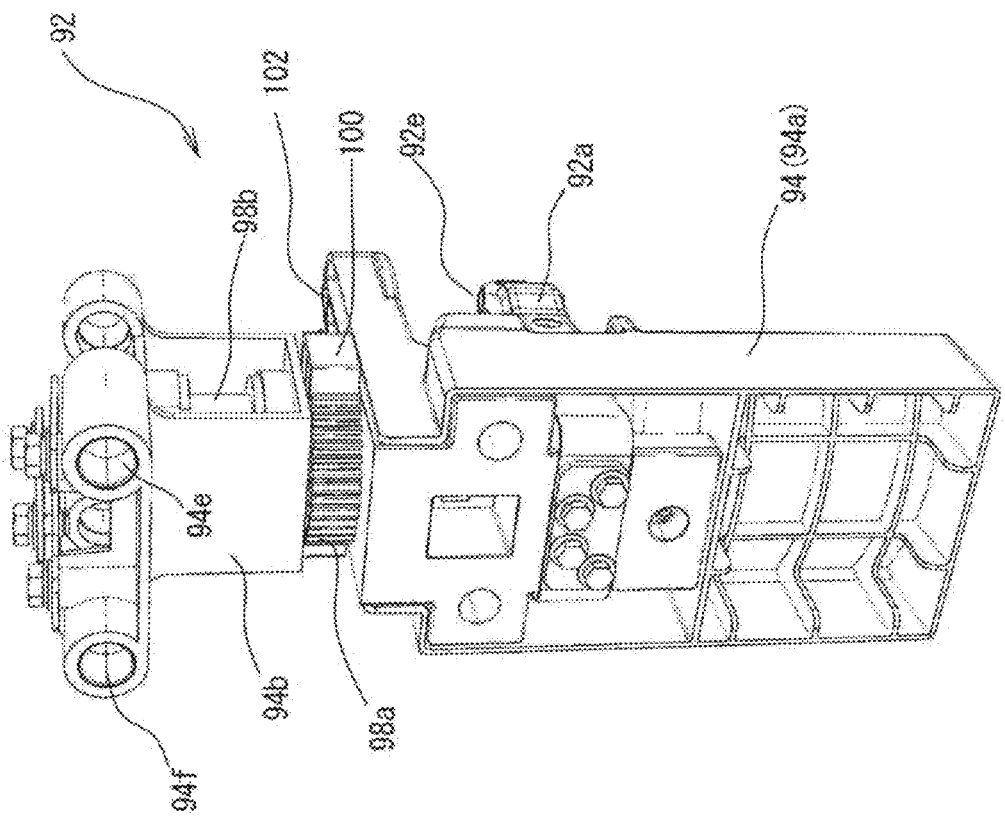
FIG. 14 is a perspective view of the vial gripping means viewed from a rear side.

As shown in FIGS. 12-14, gripping rollers 92e and 92f (rotating members) are provided at the end of the gripping arms 92a and 92b. The gripping rollers 92e and 92f are installed such that the gripping rollers 92e and 92f can freely rotate with respect to the gripping arms 92a and 92b respectively. The gripping rollers 92e and 92f can rotate along the body of the vial B when the vial B is inserted and removed between the gripping arms 92a and 92b.

The body of gripping means 94 is a member made of resin, and contains an arm installation section 94a on which the gripping arms 92a and 92b described above are installed, and a moving means connection section 94b that connects to the moving means 96. Further, at the top of the arm installation section 94a, a gear 98a (pinion), which is a part of the orientation changing mechanism 98, and a connecting shaft 98b are provided as a single body. Further, at both sides of the gear 98 are provided contact portions 100 and 100. On the upper part of the arm installation section 94a, an eaves 102 is provided. On this eaves 102, an engaging groove 102 (first engaging means) is provided.

The arm installation section 94a has a size to be accommodated in the vial discharging window 14 described later. On both sides of the arm installation section 94a are formed arm insertion holes 94c and 94d for inserting the gripping arms 92a and 92b. The gripping arms 92a and 92b are attached to the body of gripping means 94 by inserting the gripping arms 92a and 92b in the arm insertion holes 94c and 94d so as to project approximately horizontally from the front side of the arm installation section 94a, and by fixing the end portions of the arms 92a and 92b on the arm installation section 94a with screws from the back.

Figure 11:
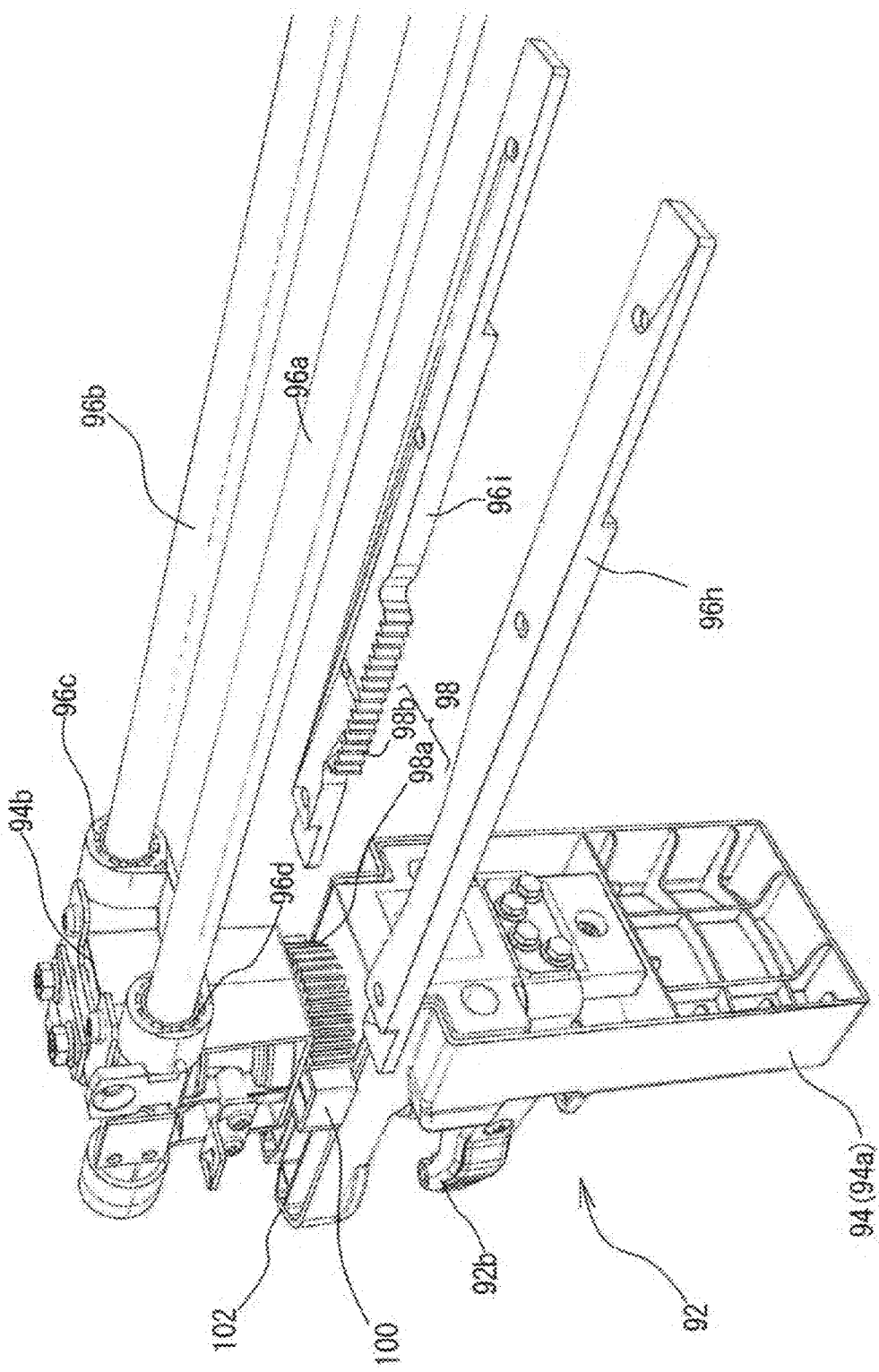
FIG. 11 is a perspective view of a vial gripping means.

The moving means connecting section 94b contains shaft insertion holes 94e and 94f. As shown in FIGS. 10 & 11, the shaft insertion holes 94e and 94f are the sections in which a support shaft 96a that constitutes the moving means 96 is inserted.

As shown in FIGS. 9-14 & 17, the contact portions 100 are provided on both sides of the gear 98a. More specifically, the contact portions 100 are provided at places adjacent to left and right sides of the gear 98a when viewed from the front (or the back) of the body of gripping means 94. As shown in FIG. 17, the contact portions 100 and 100 are the sections that contact to internal sides of guide pieces 96h and 96i and slide along the guide pieces 96h and 96i. The contact portions 100 and 100, in combination with the guide pieces 96h and 96i, function as a position determination means to determine the left-right position (horizontal position) of the vial gripping means 94 when the vial B is discharged (dispensed) in the vial discharging windows 14a-14c (see FIG. 17 (b)). Therefore, in the medicament dispensing machine 10 of this embodiment, when the vial B is discharged (dispensed) in the vial discharging windows 14a-14c, the vial gripping means 94 is always fixed at a certain position with a constant posture.

As shown in FIGS. 9-14 & 17, eaves 102 has a shape of eaves and is provided on the top side of the body of gripping means 94 as explained above. The engaging groove 102 is provided on the upper surface of the eaves 102. As a combination with an engaging piece 104 (the second engaging means) described later, the engaging groove 102 functions as a position determination means to determine the left-right position (horizontal position) of the vial gripping means 94 when the vial gripping means 94 receives (transfers) the vial B from the transporting unit 80 (see FIG. 17 (a)). The engaging groove 102 is formed such that it is extended from the front side to the rear side when viewed from the front side of the body of gripping means 94 (direction in which the gripping arms 92a, 92b project). Once the engaging piece 104 (second engaging means) later described is inserted in the engaging groove 102, the position and orientation of the body of gripping means 94 is fixed in left-right (horizontal) direction.

As shown in FIGS. 9-11, the moving means 96 is placed above the body of gripping means 94. The moving means 96 contains the shafts 96a and 96b described above, a motor 96c, pulleys 96d and 96e, a belt 96f, connecting pieces 96g, and guide pieces 96h and 96i. The shafts 96a and 96b are provided so that they extend approximately horizontally from the transporting unit 80 to the vial discharging window 14 provided in the front side 12a of the body 12. The shafts 96a and 96b are respectively inserted in shaft insertion holes 94e and 94f provided on the body of gripping means 94 described above.

Thereby, the body of gripping means 94 can move along the shafts 96a and 96b between the transporting unit 80 and the vial discharging window 14.

Motor 96c functions as a drive source for the moving means 96. It is installed so as to transmit a power to the pulley 96d. The pulleys 96d and 96e are pivoted so as to freely rotate in the locations adjacent to the transporting unit 80 and the vial discharging window 14. The belt 96f is wound between the pulleys 96d and 96e. The body of gripping means 94 described above is connected to the belt 96f via the connecting piece 96g. Once the motor 96c is started, the belt 96f wound between the pulleys 96d and 96e is driven, and the body of gripping means 94 is moved between the transporting unit 80 and the vial discharging window 14.

The guide pieces 96h and 96i are members provided so as to extend approximately horizontally from the transporting unit 80 to the discharging window 14 like the shafts 96a and 96b explained above. The guide pieces 96h and 96i are installed at a location approximately as high as where the gear 98 is installed. One of the guide pieces 96h and 96i (the guide piece 96i in this embodiment) has a rack gear 98c in the middle in its longitudinal direction. By moving the body of gripping means 94 between the transporting unit 80 and the vial discharging window 14, the gear 98a provided on the body of gripping means 94 engages with the rack gear 98c. Thereby, a rotational force for rotating the body of gripping means 94 is produced.

The orientation changing mechanism 98 reverses the direction of the body of gripping means 94 while the body of gripping means 94 moves between the transporting unit 80 and the vial discharging window 14. The orientation changing mechanism 98 contains a gear 98a and a connecting shaft 98b provided on the body of gripping means 94, and a rack gear 98b provided on the guide piece 96i of the moving means 96. The orientation changing mechanism 98 works by the engagement of the gear 98a and the rack gear 98b while the body of gripping means 94 moves between the transporting unit 80 and the vial discharging window 14.

As explained above, the gear 98a and the rack gear 98b are formed as a single body with the body of gripping means 94. If the body of gripping means 94 moves towards the vial discharging window 14, the gear 98 and the rack gear 98b engage with each other. Thereby, the body of gripping means 94 revolves (is reversed) around the connecting shaft 98b along with the gear 98a, and the gripping arms 92a and 92b face in the direction of outside of the vial discharging window 14. On the other hand, if the body of gripping means 94 moves towards the transporting unit 80, the body of gripping means 94 revolves (is reversed) around the connecting shaft 98b in a direction opposite to the direction described above. Thereby, the gripping arms 92a and 92b face to the transporting unit 80, and it is possible to receive the vial B readied in the transporting unit 80.

In this embodiment, the engaging piece 104 is provided at a front side of the transporting unit 80 (tablet supply unit 30). The engaging piece 104 is a piece-like member provided at a location where it is possible to engage with the engaging groove 102a provided on the eaves 102 explained above. Specifically, the engaging piece 104 is provided as a cantilever at a front side of the tablet supply unit 30, or a rear side 12d of the moving means 96. The engaging piece 104 is installed at a location where it can engage with the engaging groove 102a when the body of gripping means 94 reaches the location for receiving the vial B from the transporting unit 80 (side of the tablet supply unit 30). If the engaging piece 104 is inserted into the engaging groove 102a, the position of the body of gripping means 94 is determined in the left-right (horizontal) direction. And, the orientation of the body of gripping means is fixed when the vial B is transferred from the transporting unit 80 to the discharging unit 90.

<<Vial Discharging Window 14>>

Figure 15:
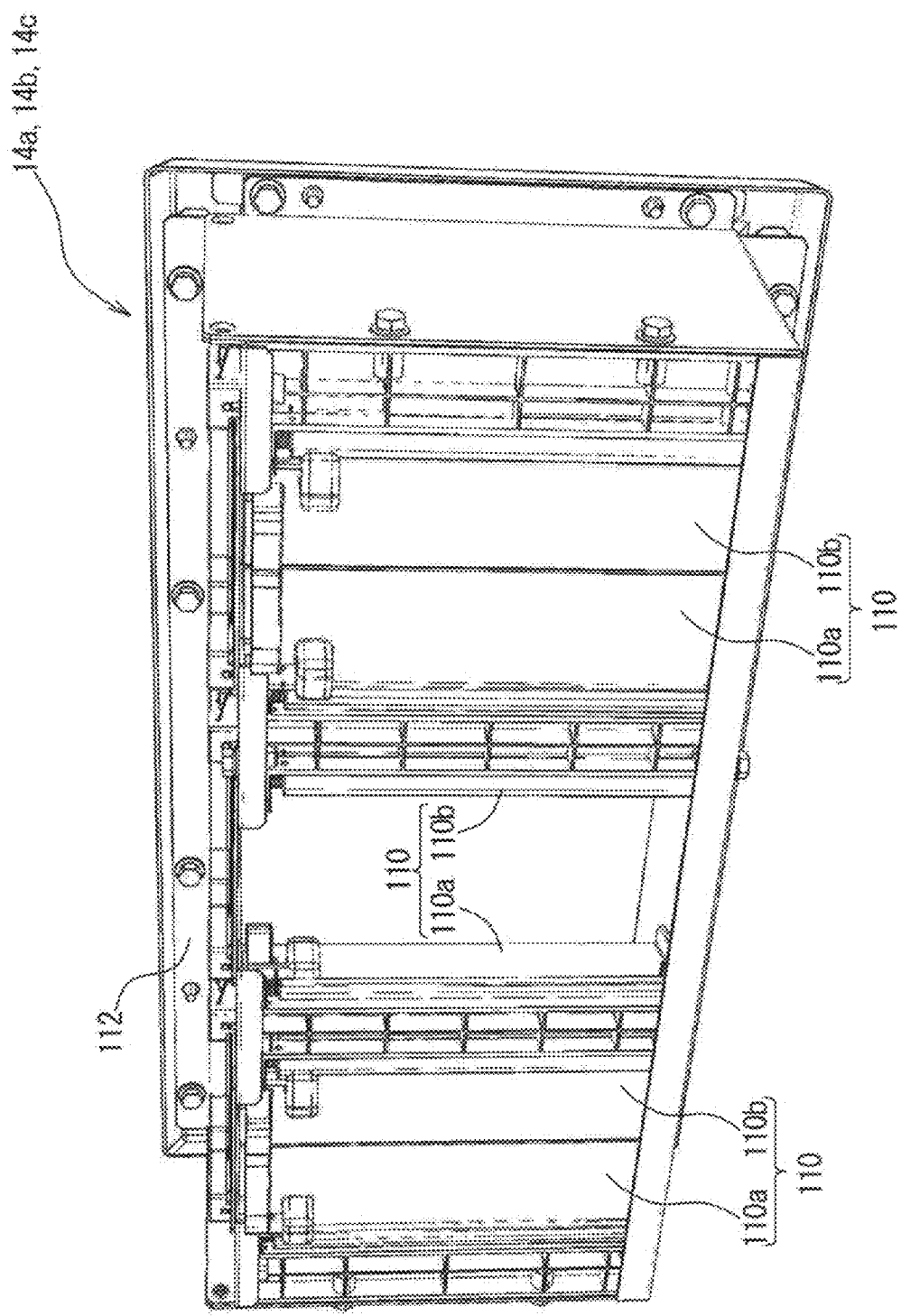
FIG. 15 is a perspective view of a vial discharging window viewed from a front side.
Figure 16:
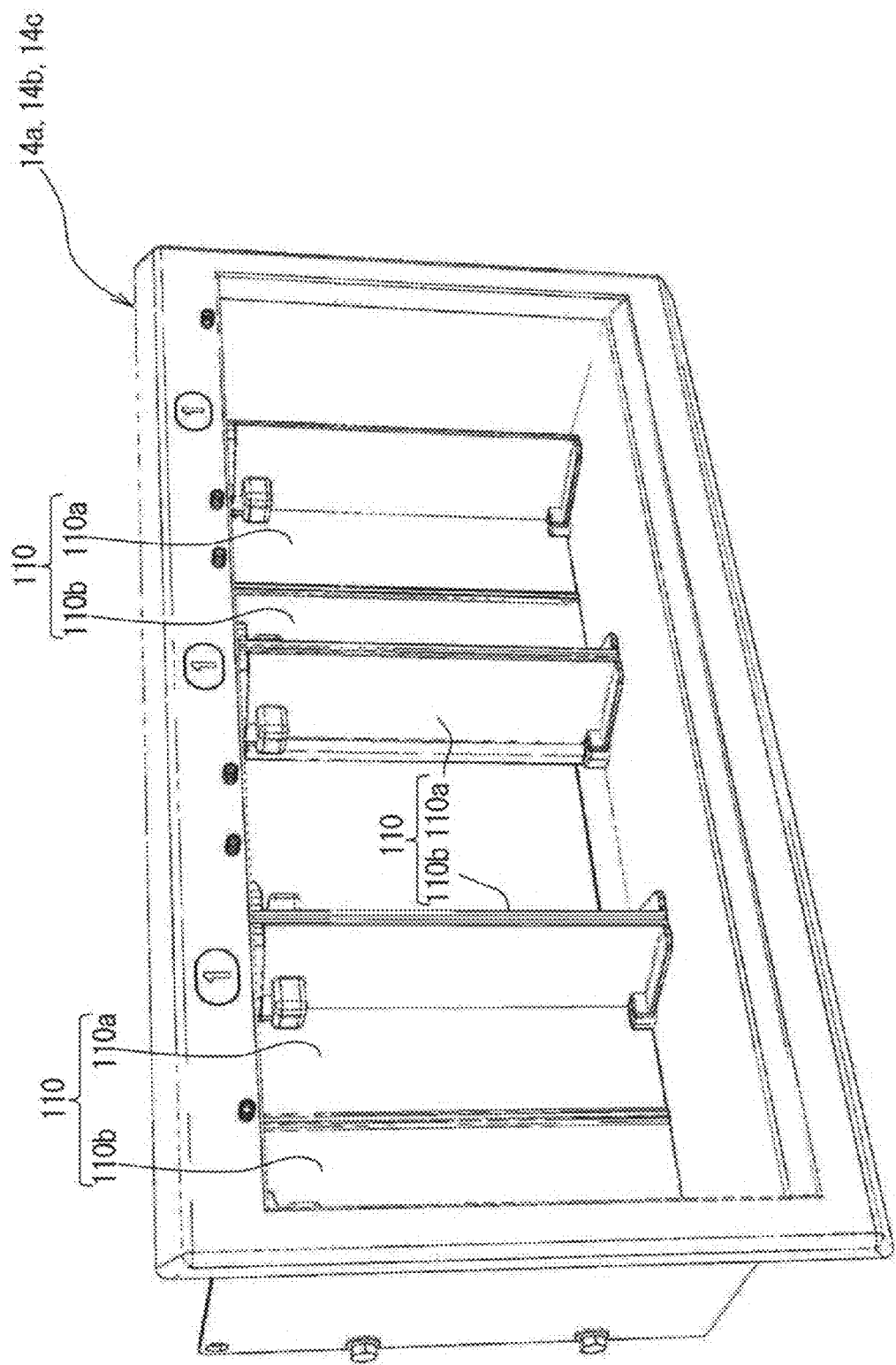
FIG. 16 is a perspective view of the vial discharging window viewed from a rear side.

As shown in FIGS. 15 & 16, the vial discharging windows 14a-14c contain three doors 110. The doors 110 are provided side-by-side in the width direction of the body 12 in a substantially rectangular frame 112 that constitutes the vial discharging windows 14a-14c. The door 110 is in the form of so-called double door in which two door plates 110a and 110b are installed on the frame 112 by hinges.

The door 110 is arranged such that it can be opened by being pressed from the inside of the body 12 to the outside. By moving the vial gripping means 92 of the discharging unit 90 described above to the vial discharging windows 14a-14c, the gripping arms 92e and 92f press the doors 110a and 110b from inside of the body 12 and the doors 110a and 110b open (see FIG. 9). Thereby, the vial B gripped by the gripping arms 92a and 92b attached to the body of gripping means 94 is exposed out of the vial discharging windows 14a-14c. The door plates 110a and 110b are biased by springs in the direction of closing the vial discharging windows 14a-14c. Therefore, by retracting the body of gripping means 94c from the outside of the vial discharging windows 14a-14c to the side of the transporting unit 80, the door plates 110a and 110b of the vial discharging windows 14a-14c are closed.

<<Action of Medicament Dispensing Machine 10>>

The medicament dispensing machine 10 of this embodiment features actions of transferring the vial B from the tablet supply unit 30, where the vial B is filled with the medicament, through the transporting unit 80 and thorough the discharging unit 90 to the vial discharging windows 14a-14c, where the vial B is discharged. The action of the medicament dispensing machine 10 is described in detail hereinafter. If it is ready to fill the vial B with the medicament and dispense it, first the takeout means 50 and the first conveying means 52 starts. The vial B is taken out from the stocker 42 and transferred to the first conveying means 54. During this time, the first conveying means 54 is set as a state (state for receiving) in which the orientation of the frame 54a is adjusted so that the conveying direction becomes the same as the transferring direction of transfer conveyor 52b. Also, the pulleys 54b and 54b are driven. Thereby, the vial B taken out from the stocker 42 is sent to the first conveying means 54 from the transfer means 52.

Once the vial B is sent to the first conveying means 54, the reverse mechanism 58 is activated based on necessity, and the bottom of the vial B orients in the direction of the bottle guide means 60. In this state, the first conveying means 54 is again driven, and the vial B is supplied to the bottle guide means 60. Thereby, the vial B is erected, with its bottom orienting in the downward direction, on the lifting bench 22 of the vial lifter 20 adjacent to the bottle guide means 60. Subsequently, the lifting bench 22 is lowered. And, a label is pasted on the body of the vial B in the labeling unit 70 provided below the bottle guide means 60.

Once the pasting of the label on the vial B is completed, the vial lifter 20 runs again, and the lifting bench 22 moves upward in the body 12. Subsequently, the empty vial B is transferred to the transporting unit 80, and a certain medicament is filled in the vial B. Once the filling of the medicament into the vial B is complete, the vial B is moved to the discharging unit 90 by the transporting unit 80.

In the discharging unit 90, the body of gripping means 94 are retracted inside the body 12, and the gripping arms 92a and 92b project towards the transporting unit 80 (rear side 12d). The vial B transported by the transporting unit 80 is inserted and gripped between the gripping arms 92a and 92b. If the switches 92c and 92d provided on the gripping arms 92a and 92b become ON, it is confirmed that the vial B is gripped, and the transfer of the vial B from the transporting unit 80 to the gripping arms 92a and 92b is completed. Subsequently, the motor 96c of the moving means 96 is initiated. Thereby, the body of gripping means 94 moves along the shafts 96a and 96b and the guide pieces 96h and 96i towards the vial discharging windows 14a-14c.

As explained above and as shown in FIG. 17 (a), upon the transfer of the vial B from the transporting unit 80 to the vial gripping means 92, the engaging piece 104 gets into and becomes engaged with the engaging groove 102a provided on the eaves 102 of the body of gripping means 94. Thereby, the left-right (horizontal) location of the body of gripping means 94 is determined. Therefore, upon the transfer of the vial B from the transporting unit 80 to the vial gripping means 92, failure of the transfer of the vial B is well prevented. Furthermore, even after receiving the vial B, the body of gripping means 94 slides, being supported by the guide pieces 96h and 96i. Thus, horizontal shaking of the vial B is well prevented, and the vial B is stably transported to the vial discharging window 14.

While the body of gripping means 94 is moving, the gear 98a provided on the body of gripping means 94 becomes engaged with the rack gear 98c provided on the guide piece 96i in the middle of the path from the transporting unit 80 to the vial discharging windows 14a-14c. In this situation, as the body of gripping means 94 moves towards the vial discharging windows 14a-14c, the body of gripping means 94 revolves around the connecting shaft 98b, and the gripping arms 92a and 92b orients in the direction of the vial discharging windows 14a-14c. After the body of gripping means 94 further moves toward the vial discharging windows 14a-14c, the door plates 110a and 110b are pressed and opened by the gripping arms 92a and 92b. Then, the gripping arms 92a and 92b go out of the door 110, gripping the vial B.

As shown in FIG. 17 (b), in the state where the body of gripping means 92 has reached the vial discharging windows 14a-14c, the contact portions 100 and 100 are in contact with the surface of the guide pieces 96h and 96i facing inside. Thereby, the position of the body of gripping means 94 is determined in left-right directions (horizontal direction). Therefore, even while dispensing (discharging) the vial B, the body of gripping means 92 maintains its constant orientation. Thus, dispensing failure of the vial B (discharging failure) due to the positioning failure of the body of gripping means 92 is well prevented.

As explained above, once the vial B is exposed outside of the vial discharging windows 14a-14c, the vial B is ready to be pulled out from the gripping arms 92a and 92b. If the switches 92c and 92d become OFF and it is confirmed that the vial B is taken out from the gripping arms 92a and 92b, the motor 96c of the transfer means 96 described above begins to drive in a direction opposite to the direction described above. Thereby, the body of gripping means 94 retracts towards the inside of body 12 (direction toward the transporting unit 80). Once the body of gripping means 94 reaches the location where the rack gear 98c is provided on the guide piece 96i, the gear 98a provided on the body of gripping means 94 engages with the rack gear 98c. As the body of gripping means 94 further moves in the direction of the transporting unit 80, the body of gripping means 94 revolves around the connecting shaft 98 in a direction opposite to the direction described before. Thereby, the gripping arms 92a and 92b project toward the transporting unit 80. As a result, the gripping arms 92a and 92b become ready to receive a next vial B from the transporting unit 80.

The medicament dispensing machine 10 of this embodiment can make the vial B held between the pair of gripping arms 92a and 92b provided in the vial gripping means 92. Therefore, in the medicament dispensing machine 10 of this embodiment, the vial gripping means 92 can receive and grip the medicament-filled vial B from the transporting unit 80 and transport to the vial discharging windows 14a-14c no matter what size or shape of vials are stocked in the body of the machine as long as the sizes of the vials are within the range of what the gripping arms 92a and 92b can grip.

In the medicament dispensing machine 10, the gripping rollers 92e and 92f are provided at the tip of the gripping arms 92a and 92b so that they can freely rotate upon contacting to the body of the vial B. Thus, a problem that the label pasted by the label pasting means 70 is damaged is well prevented while the vial B is being removed from the gripping arms 92a and 92b. In the above embodiment, the gripping rollers 92e and 92f are provided on both the gripping arms 92a and 92b. However, the present invention is not limited to this, and the roller may be provided only on one of the arms. In this embodiment, as an example of rotating members, the gripping rollers 92e and 92f that can rotate contacting to the body of the vial B are provided. However, the rotating members are not limited to the rollers and can be comprised of balls.

In the medicament dispensing machine 10, the vial discharging windows 14a-14c open in coordination with the movement of the body of gripping means 94 to the vial discharging windows 14a-14c. Therefore, the vial can be smoothly dispensed out of the vial discharging windows 14a-14c. Further, in the medicament dispensing machine 10, after the vial B is removed from the gripping arms 92a and 92b projecting out of the vial discharging windows 14a-14c, the vial gripping means 92 retracts into the body 12. Coordinating with this, the vial discharging windows 14a-14c close. Therefore, in the medicament dispensing machine 10, after the vial B is taken out from the gripping arms 92a and 92b, it is possible to smoothly perform a next series of dispensing operations of the vial B.

In the medicament dispensing machine 10, the switches 92c and 92d are provided on the surfaces (contact portions) of the gripping arms 92a and 92b, where the gripping arms 92a and 92b contact to the body of the vial B. If the switches 92c and 92d become ON and it is confirmed that the vial is gripped, transfer of the vial B to the gripping arms 92a and 92b is executed. If either of the switches 92c and 92d is only ON, transfer of the vial B is not carried out. Therefore, it is possible to prevent a delivery failure of the vial B due to a breakdown of the gripping arms 92a and 92b.

In this embodiment, the switches 92c and 92d are provided on both of the gripping arms 92a and 92b. However, it is possible to provide only one switch. In the case only either of the switches 92e and 92f is provided on either of the gripping arms 92a and 92b, it may not be possible to detect the gripping failure of the vial B with the detection method explained above. It is still desirable to configure to detect the gripping failure by employing other method, architecture or mechanism.

In this embodiment, the switches 92c and 92d are provided as the vial detection means to detect whether the vial B is gripped or not by the vial gripping means 92. However, the present invention is not limited to these, and instead of the switches 92c and 92d, photoelectric sensors may be used.

In this embodiment, the vial gripping means 92 is comprised of the gripping arms 92a and 92b having approximately left-right symmetrical shapes. However, the present invention is not limited to this, and the gripping arms 92*a* and 92*b* may have asymmetric shapes.

In this embodiment, to prevent the delivery failure of the vial B in the vial gripping means 92, the positioning means is composed of a combination of the contact portions 100 and 100 and the guide pieces 96*h* and 96*i*, or composed of a combination of the engaging groove 102 and the engaging piece 104. However, the present invention is not limited to these configurations, and a configuration without the positioning means is even possible. The positioning means of the vial gripping means 92 explained above is just one example of the present invention, and other configuration may be adopted to determine the position of the vial gripping means 92. Furthermore, in this embodiment, the position of the vial gripping means 92 is determined by the combination of the engaging groove 102 and the engaging piece 104 in the location where the vial B is transferred from the transporting unit 80 to the vial gripping means 92. However, it is also possible to provide a part similar to the engaging piece 104 near the vial discharging windows 14*a*-14*c*. Then, the position of the vial gripping means 92 is determined when the vial B is discharged (dispensed) from the vial discharging windows 14*a*-14*c*.

Figure 18:
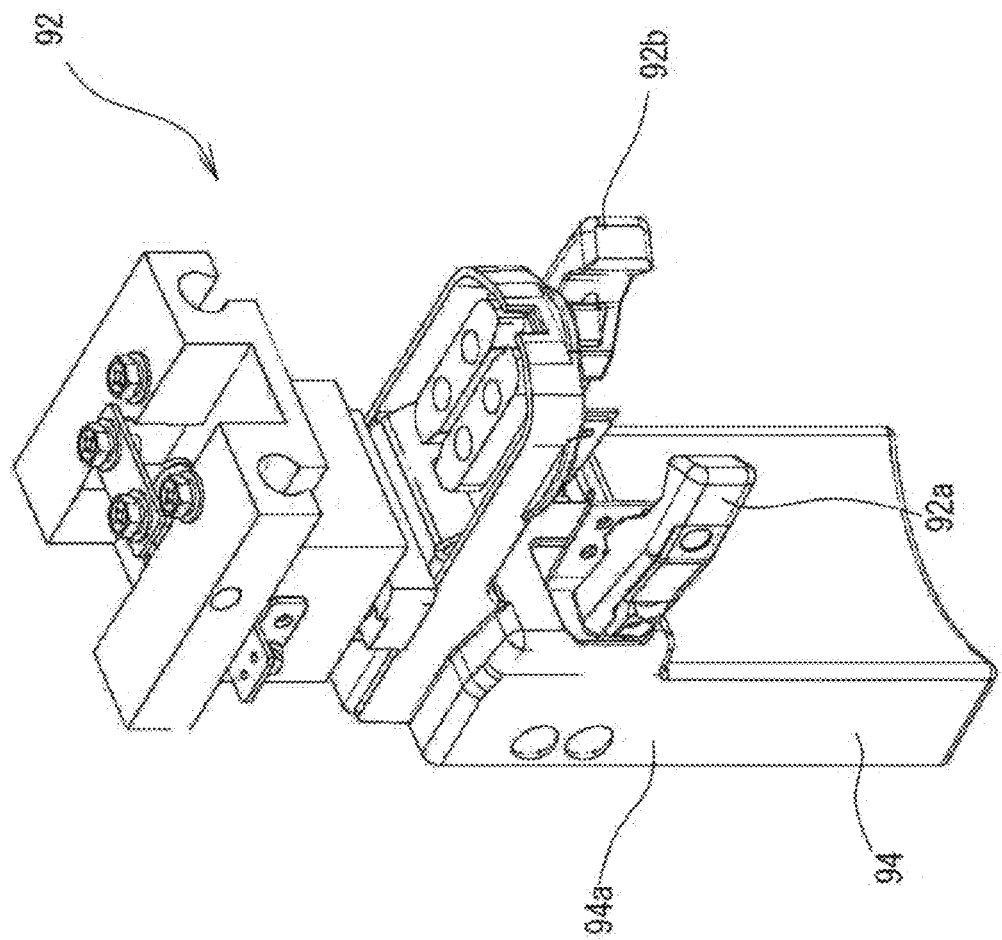
FIG. 18 is a perspective view of a body of gripping means of one modification example.

In this embodiment, the gripping rollers 92*e* and 92*f* are provided at the ends of the gripping arms 92*a* and 92*b* to prevent the damage of the label during the delivery of the vial B by vial gripping means 92. However, the present invention is not limited to this. In the case a label is not pasted on the vial B, the label printer 72 is not provided, or the label damage does not matter, as shown in FIG. 18, the gripping rollers 92*e* and 92*f* can be omitted.

<<Modification Example of Discharging Unit 150>>

Figure 19:
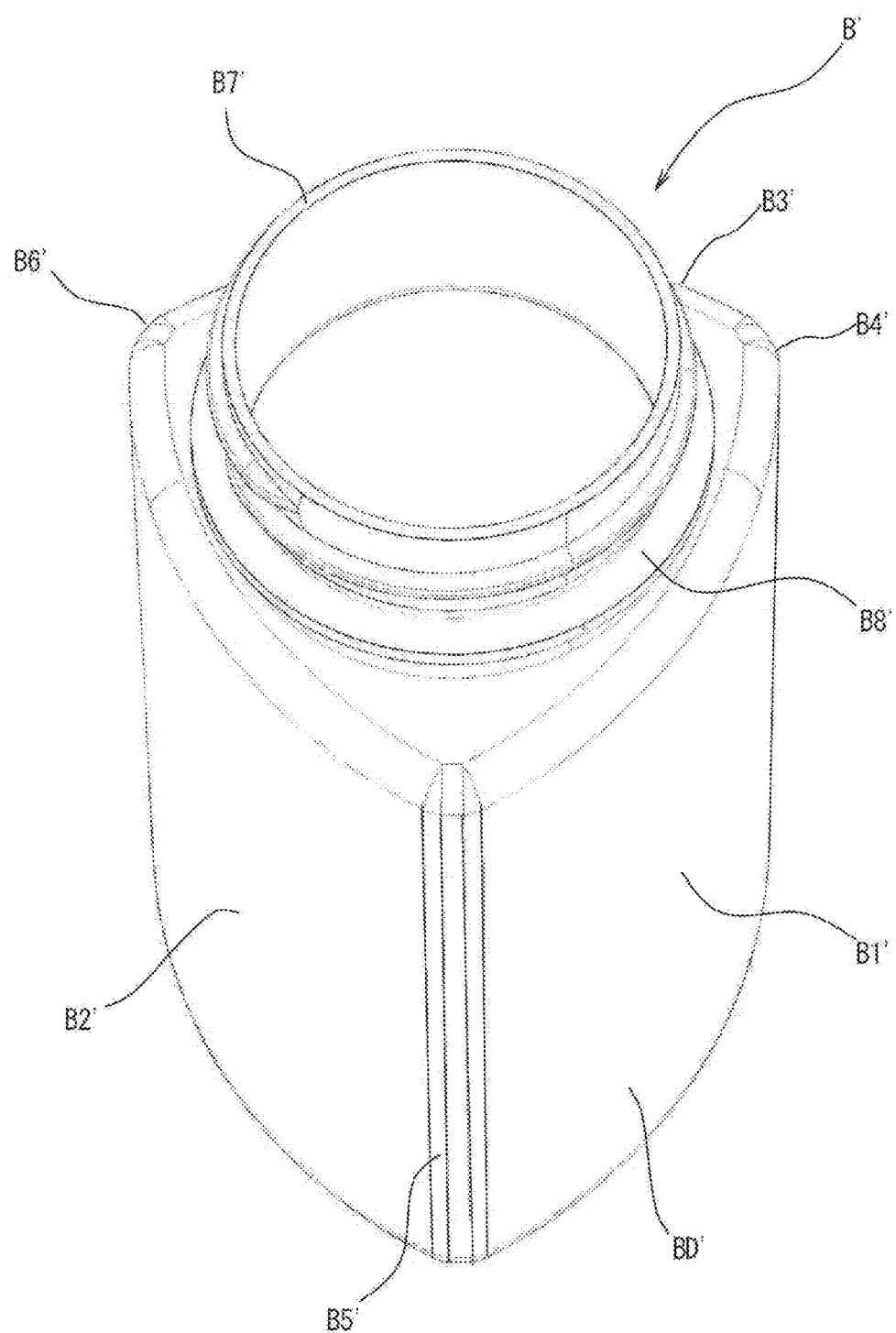
FIG. 19 is a perspective view of a vial whose body has an approximately triangular cross-sectional shape.

The discharging unit 90 described above is optimally used for the vial B whose body has a cylindrical shape. However, in the case the body of the vial has a polygonal cross-sectional shape such as vial B' shown in FIG. 19, whose body has a triangular shape, the gripping arms 92*a* and 92*b* of the discharging unit 90 are difficult to fit to the body of the vial B'. And, sufficient stability may not be obtained while the gripping arms 92*a* and 92*b* are gripping the vial B'. Therefore, to deal with the vial B' whose body has a polygonal cross-sectional shape, it is preferable to use gripping arms having shapes that can easily fit to the body of the vial B'.

In addition, even in either case of using the vial B whose body is cylindrical or using the vial B' whose body is polyhedral, to stably transport the vials B and B' to the vial discharging windows 14*a*-14*c*, it is preferable to configure a structure to grip a neck (neck B7') portion (opening end, upper end) of the vials B and B'. To solve such problems, it is possible to use a discharging unit 150 shown in FIG. 20 instead of the discharging unit 90. Below, the structure of the discharging unit 150 is described, referring figures. Since the discharging unit 150 has many structures, functions, and effects common to those of the discharging unit 90, the same numbers are used for the parts having the structures same as those of the discharging unit 90, and their explanations are omitted.

The discharging unit 150 supplies and discharges the vial B' from the transporting unit 80 to the vial discharging window 14. The discharging unit 150 is located in the same position as that of the discharging unit 90. The discharging unit 150 has a similar structure as that of the discharging unit 90 described above and contains a body of gripping means 94, a moving means 96 and an orientation changing mechanism 98. Since the structures, functions and effects of the body of gripping means 94, the moving means 96 and the orientation changing mechanism 98 are same as described above, their detailed explanations are omitted.

In contrast, the discharging unit 150 differs from the discharging unit 90 in that the discharging unit 150 contains a vial gripping means 152 and a vial holder 154 instead of the vial gripping means 92. The vial gripping means 152 receives and grips the vial B', which is filled with medicament in the tablet supply unit 30, from the transporting unit 80. These functions are same as those of the gripping means 92. However, the vial gripping means 152 has different structures from those of the gripping means 92 in that the vial gripping means 152 contains gripping arms 156 and 158 instead of the pair of gripping arms 92*a* and 92*b*.

Figure 20:
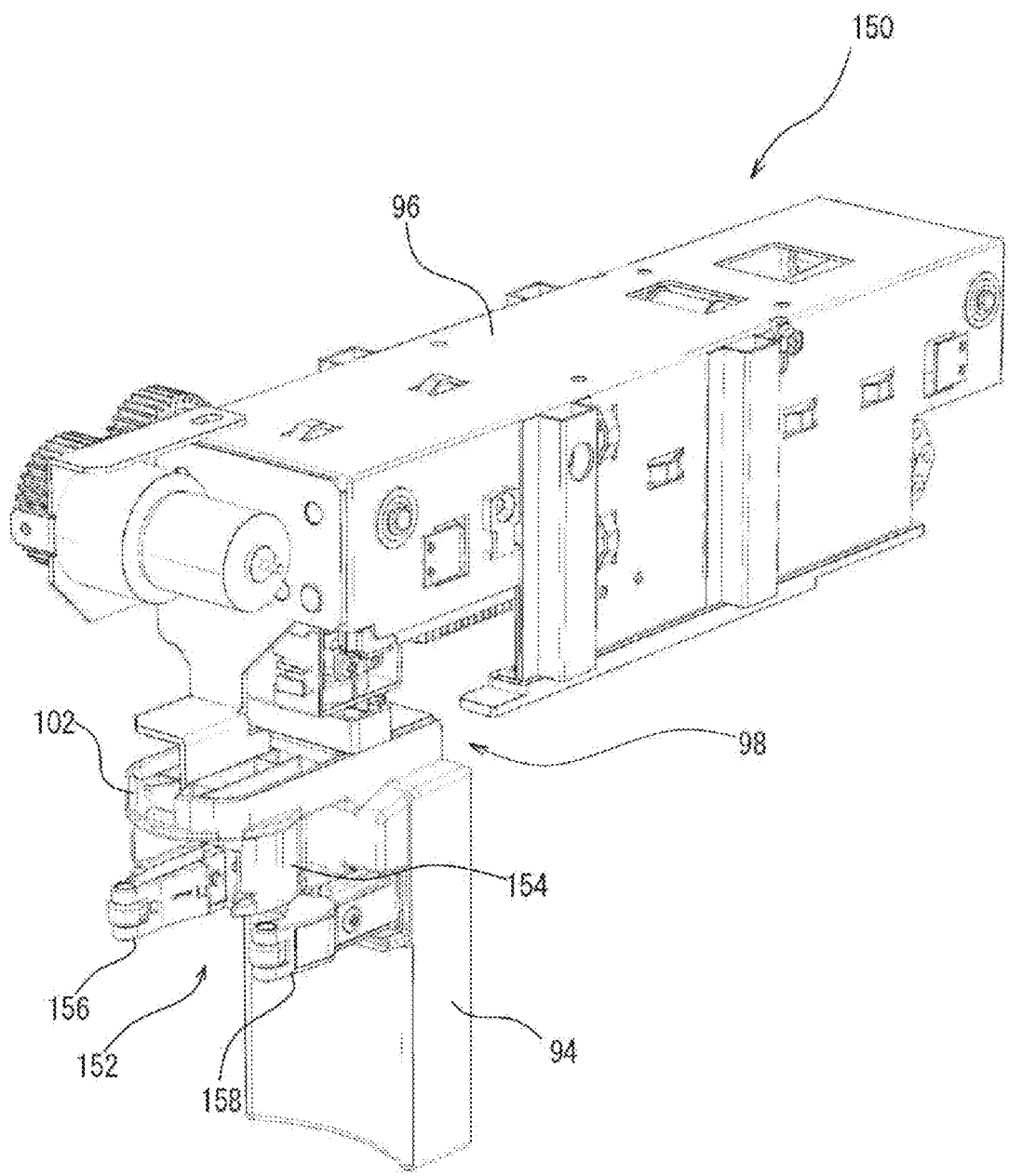
FIG. 20 is a perspective view of a discharging unit of the modification example.
Figure 21:
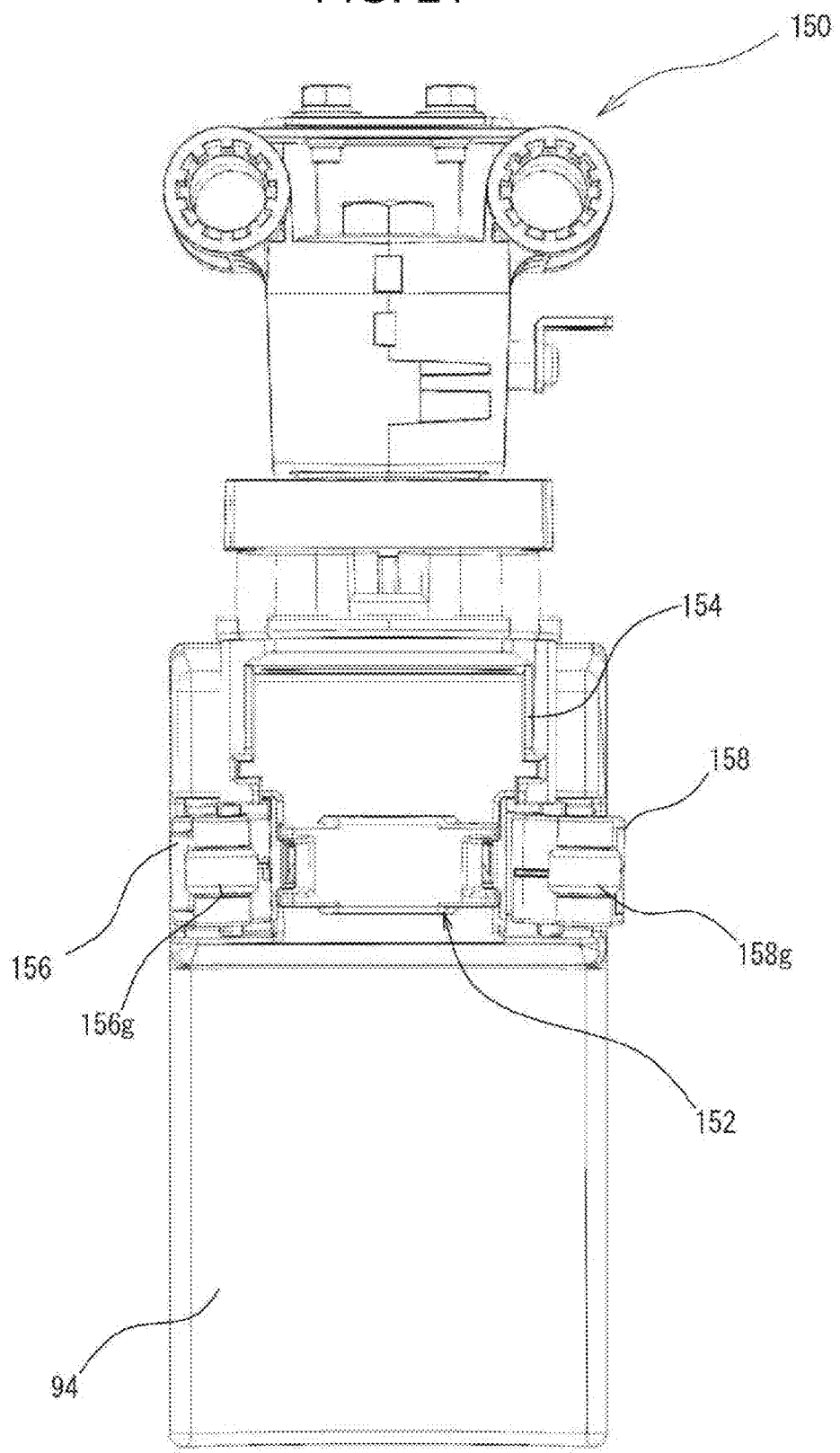
FIG. 21 is a front view of the discharging unit shown in FIG. 20.
Figure 22:
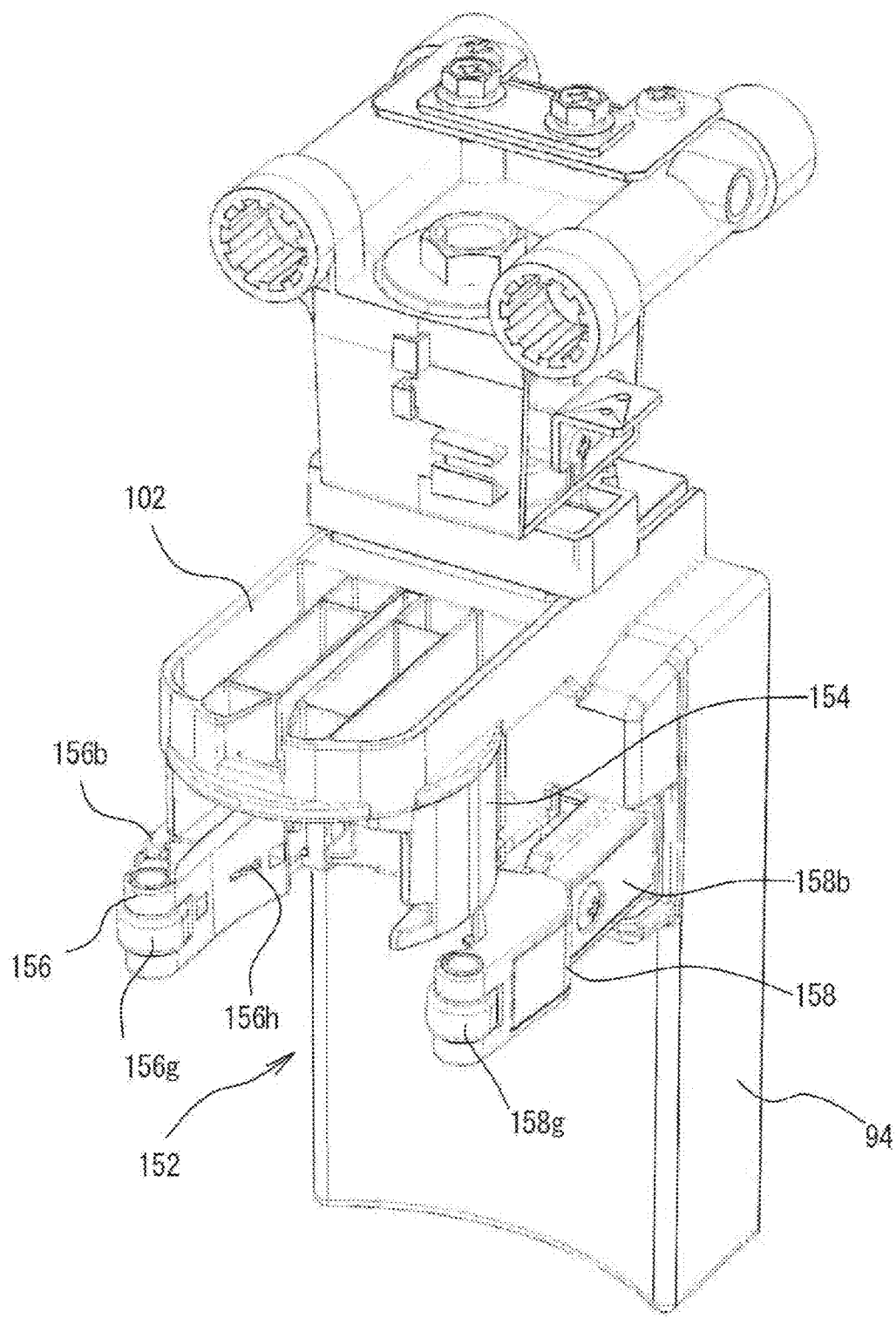
FIG. 22 is a perspective view of main parts of the discharging unit shown in FIG. 20.
Figure 25:
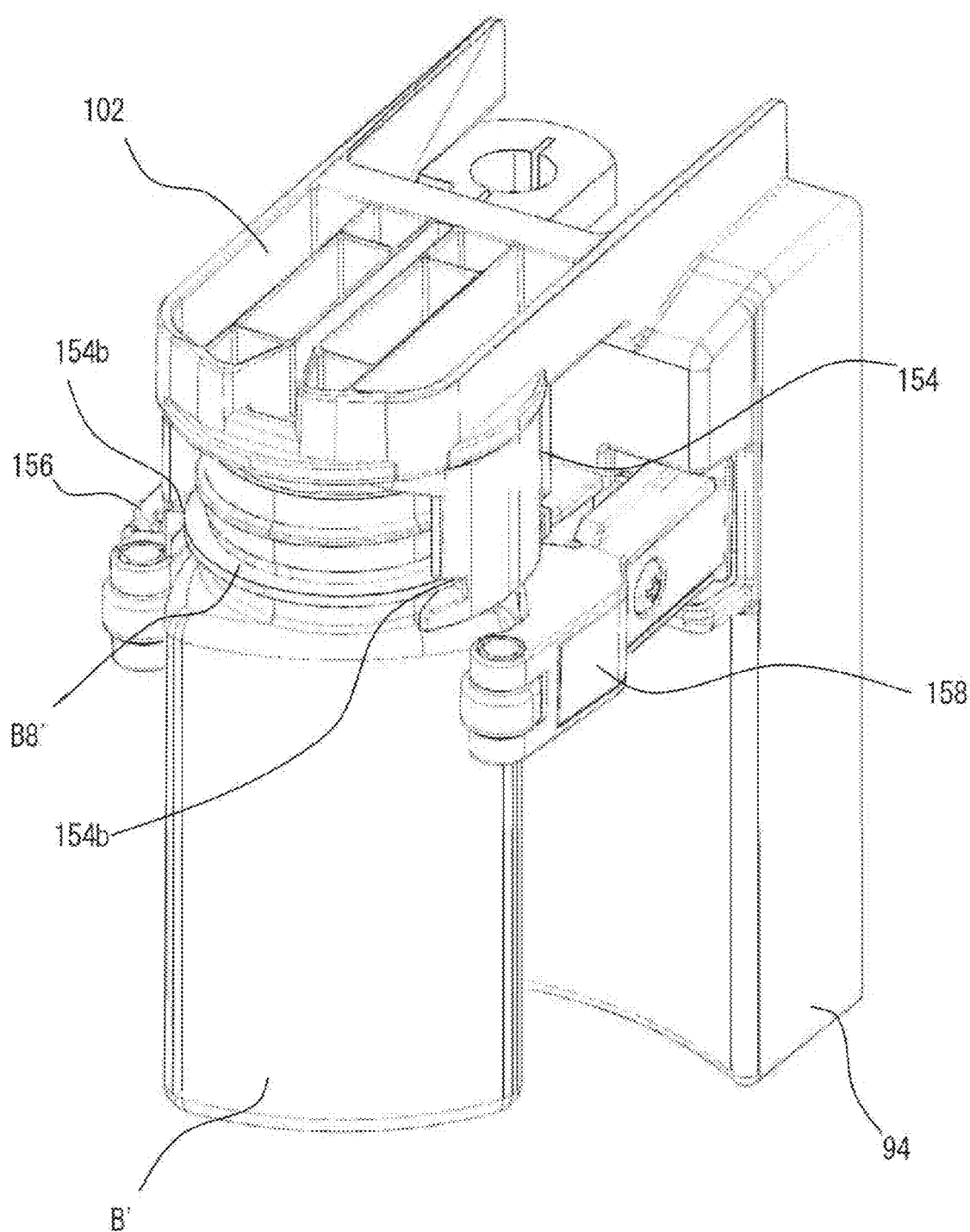
FIG. 25 is a magnified perspective view showing a state in which main parts of the discharging unit shown in FIG. 20 grip the vial.

As shown in FIGS. 20-22, the gripping arms 156 and 158 are arm-shaped members installed at left and right positions of the body of gripping means 94. As shown in FIGS. 23 & 24, the gripping arms 156 and 158 have a configuration in which a pair of grips 156*b* and 158*b* is provided at the tips of metal supports 156*a* and 158*a*. Grips 156*b* and 158*b* are parts for pinching and gripping the body BD' of the vial B' that has a trihedral shape.

Grip 156*b* has a configuration in which a body of grip 156*c* and a gripping piece 156*d* is connected by a pin 156*e*. The body of grip 156*c* is attached to the end of the support 156*a*. The body of grip 156*c* supports the gripping piece 156*d* so that the gripping piece 156*d* can swing around the pin 156*e*. A contact surface 156*f* is provided on the gripping piece 156*d* to facilitate the contact with the body BD' of the vial B'. As shown in FIGS. 23 (*b*) & 24 (*b*), the contact surface 156*f* has a shape such that the contact surface 156*f* fits to the sides B1'-B3' of the body BD' of the vial B'. The vial B' of this modification example has shapes of the sides B1'-B3' that are not flat but are curved like an arc. Therefore, the contact surface 156*f* has a curved shape with a curvature radius approximately similar to that of sides B1'-B3'.

At the tip of the gripping piece 156*d*, a gripping roller 156*g* (rotating member) is provided such that it can rotate freely. Like the gripping rollers 92*e* and 92*f*, the gripping roller 156*g* is provided to facilitate a smooth insertion and removal of the vial B' between the gripping arms 156 and 158, and to prevent a damage of the label pasted on the vial B'.

The gripping body 158*b* pairing with the gripping body 156*b* explained above contains a contact surface 158*f* capable of contacting with the body BD' of the vial B'. In the contact surface 158*f* is provided a bent portion 158*i* in which the contact surface 158*f* is bent to fit to the shapes of corners B4'-B6' formed around the junctions between the sides B1'-B3' on the body BD' of the vial B'.

Switches 156*h* and 158*h* are provided on the contact surface 156*f* of the gripping piece 156*d* and the contact surface 158*f* of the gripping body 158*b*. The switches 156*h* and 158*h* correspond to the switches 92*c* and 92*d* described above, and are used for detecting whether the vial B' is gripped by the gripping arms 152*a* and 152*b*. Switches 156*h* and 158*h* are electrically connected to a controller (not shown in the figure) of the medicament dispensing machine 10.

When both the switches 156*h* and 158*h* are ON, the gripping arms 156 and 158 are in a state in which the vial B' is firmly gripped. In the case the gripping arms 152*a* or 152*b* are broken, gripping the vial B' is not firm, or the shapes of the gripping sections of the gripping arms 152*a* or 152*b* do not fit to the outer circumference of the vial B' because of the polygonal shape of the vial, either of the switches 156*h* and 158*h* does not become ON, and the presence of the vial B' is not detected. In such a situation, transfer of the vial B' to the gripping arms 92*a* and 92*b* is not uncertain. Thus, the vial B' may not be securely gripped. It may be expected that the vial B' may fall inside the machine and result in a spill of the medicament. If it is determined that the transfer of the vial B' from the transporting unit 80 to the discharging unit 150 is complete based on the condition of both the switches 156h and 156h being ON, failures explained above can be prevented.

The vial holder 154 holds the neck B7' of the vial B'. As shown in FIGS. 20-22 & 25, the vial holder 154 is provided on a lower side of the eaves 102 that constitutes the body of gripping means 94. As shown in FIG. 26, the vial holder 154 has a space 154a where the neck B7' of the vial B' is accommodated. Grooves 154b are provided on both sides of the space 154a. As shown in FIG. 27, a flange B8' formed on the neck B7' of vial B' is inserted in the grooves 154b. Therefore, by inserting the neck B7' and the flange B8' in the space 154a and the grooves 154b with the vial B' upright, the vial B' is held at the neck portion B7'. This further improves the stability of the vial B' gripped by the vial gripping means 152.

<<Modifications Example of Transporting Unit 80>>

As shown in FIG. 4, the transporting unit 80 described above contains the gripping section that grips the vials B, B' by pinching the body BD' of the vials B and B' received from vial lifter 20. Specifically, as shown in FIG. 4, the gripping section of the transporting unit 80 contains transporting arms 82 and 84 for pinching the body BD' of the vials B, B'.

Figure 28:
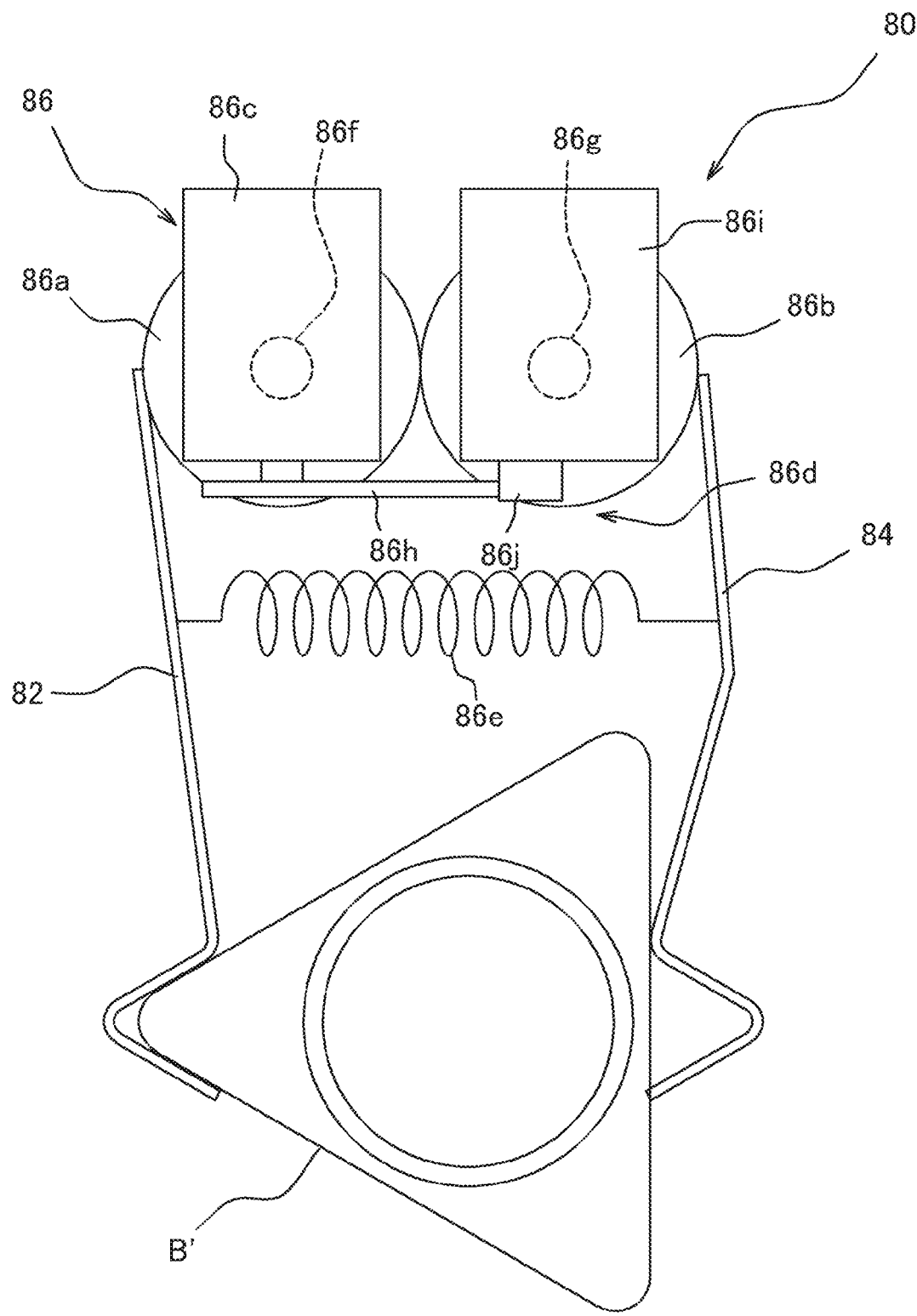
FIG. 28 is a schematic plan view showing a transporting unit of a modification example.
Figure 29:
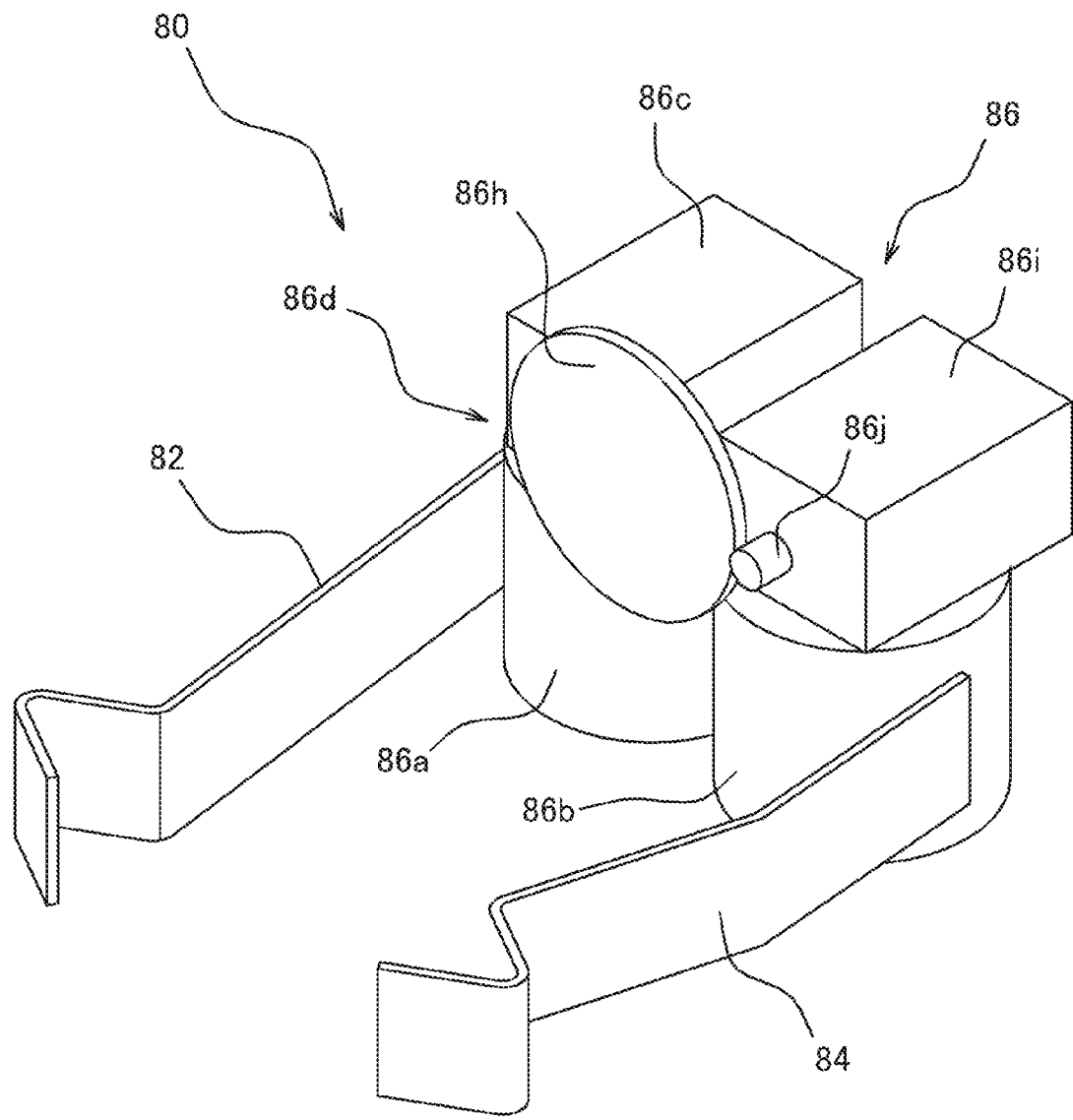
FIG. 29 is a perspective view of the transporting unit shown in FIG. 28 with its spring omitted.

In the case, the body BD' has a polygonal cross-sectional shape (triangular shape in the example shown in FIG. 19) like the vial B' described above, like the gripping arms 156 and 158 of the discharging unit 150 described above, it is preferable that the transporting arms 82 and 84 of the discharging unit 80 are configured to have shapes that fit to the shape of the body BD' of the vial B'. Specifically, as shown in FIGS. 28 & 29, it is preferable to configure the transporting arms 82 and 84 of the discharging unit 80 to have bent shapes that fit to the shapes of the corners B4'-B6' of the vial B'. By configuring the transporting arms 82 and 84 to have such shapes, it is possible to stably transfer the vial B' received from the vial lifter 20 to the discharging unit 90 or the discharging unit 150.

The transporting unit 80 contains an actuator 86 for driving the transporting arms 82 and 84. The actuator 86 contains cylindrical rotors 86a and 86b, motor 86c that functions as a drive source, a cam mechanism 86d, and a spring 86e. The cylindrical rotors 86a and 86b are installed so as to rotate around rotating shafts 86f and 86g in the body of the transporting unit 80. The basal ends of the transporting arms 82 and 84 are fixed on the outer circumference of the rotors 86a and 86b. Therefore, by rotating the rotors 86a and 86b, the transporting arms 82 and 84 can be opened and closed.

The motor 86c is installed on the rotor 86a as a single body. A cam 86h that constitutes the cam mechanism 86d is attached to the output shaft of the motor 86c. The cam 86h rotates eccentrically by running the motor 86c. A contact member 86i that constitutes the cam mechanism 86d is installed on the rotor 86b as a single body. The contact member 86i has a cylindrical projection 86j, and the outer periphery of the cam 86h contacts with the outer periphery of this projection 86j. Therefore, by driving the motor 86c, the transporting arms 82 and 84 are opened and closed by rotating the rotors 86a and 86b by the action of the cam mechanism 86d. Further, the spring 86e is provided in the basal end portion of the transporting arms 82 and 84 (omitted in FIG. 29). The transporting arms 82 and 84 are always biased in the closing direction by the spring 86e.

The transporting unit 80 receives the vial B or B' and releases the gripping vials B and B' by driving the actuator 86 and widening the gap between the transporting arms 82 and 84. After receiving the vial B or B', the transporting arms 82 and 84 are forced to press the body of the vial B or B' due to the bias force of the spring 86e. Thereby, the vial B or B' is gripped by the transporting arms 82 and 84.

In this modification example, the spring 86e is used for generating the gripping force of the transporting arms 82 and 84, and the motor 86c is used as a power source to open the transporting arms 82 and 84. However, the present invention is not limited to this. For example, the device may be configured such that a motor or other driving source may generate a force to close the transporting arms 82 and 84, or a driving source may generate a gripping power for the transporting arms 82 and 84. In other words, a motor or other driving source may be configured to make the transporting arms 82 and 84 not only open but also close.

In such a configuration, by applying overcurrent to the motor or other driving source to close the transporting arms 82 and 84, it is possible even to grip the vials B or B' having different sizes. If the driving source is operated so that the transporting arms 82 and 84 close even after the transporting arms 82 and 84 are in contact with the body of the vial B or B' to grip the vial B or B', it is possible to strongly grip the vial B or B', no matter what size and shape the vial B or B' has. If the power consumption of the drive source due to the overcurrent is excessive, or if the vial B or B' cannot be gripped firmly enough even by applying the overcurrent to the drive source, it is preferable to utilize the bias force of the spring 86e to generate the gripping force of the vial B or B' as explained in the modification example above (see FIG. 28). Thereby, the motor or the other driving source is prevented from worn-out caused by the overcurrent, and the longevity of the driving source can be prolonged.

<<Action of Transferring the Vial B or B' to the Discharging Unit 90 or 150>>

Next, the action of the modification example of transferring the vial B or B' to the discharging unit 90 or 150 from the transporting unit 80 is described. The transfer of the vial B or B' from the transporting unit 80 to the discharging unit 90 or 150 is completed if the switches 92c and 92d or the switches 156h and 158h provided in the discharging unit 90 or 150 become ON, and the transporting unit 80 releases the vial B or B'.

If the switches 92c and 92d or the switches 156h and 158h do not become ON because of insufficient accuracy of positioning of the transporting unit 80 to the discharging unit 90 or 150, transferring operation of the vial B or B' cannot be completed. When the transferring operation cannot be properly completed, there is a possibility that an error notification is reported by a notifying means (not shown in the drawing) provided separately.

To eliminate such possibility, upon transferring the vial B or B' from the transporting unit 80 to the discharging unit 90 or 150, it is preferable to run an operation (transfer check operation) of further moving the transporting unit 80 towards the discharging unit 90 or 150 if the switches 92c and 92d or the switches 156h and 158h do not become ON. In other words, it is preferable to perform an operation (transfer check operation) to adjust the degree of pressing the switches 92c and 92d or the switches 156h and 158h by adjusting the distance of the transporting unit 80 to the discharging unit 90 or 150. In addition to performing this transfer check operation, by checking whether the switches 92c and 92d or the switches 156h and 158h become ON or not, it is possible to avoid a maldetection due to the contact failure between the vial B or B' and the switches 92c and 92d or the switches 156h and 158h. It is possible to adjust the movement amount of the transporting unit 80 based on the situation of the transfer check operation. In the transfer check operation, the transporting unit 80 can be moved not only in the approaching direction to the discharging unit 90 or 150 but also in a direction away from it.

In the case the switches 92c and 92d or the switches 156h and 158h do not become ON even after executing the transfer check operation, it is preferable to execute the transfer operation of the vial B or B' after returning the transporting unit 80 to a default position (retry operation). By performing the retry operation, it is possible to avoid problems of errors due to the contact failure between the vial B or B' and the switches 92c and 92d or the switches 156h and 158h.

Furthermore, despite the execution of the transfer check operation described above, when the completion of the vial B or B' is not confirmed, there is a possibility that the contact failure between the vial B or B' and the switches 92c and 92d or the switches 156h and 158h is caused not because of the distance from the transporting unit 80 to the discharging units 90 and 150, but because of the inadequate accuracy in a vertical or left-right positioning. Therefore, even when the transfer of the vial B or B' cannot be completed in spite of the transfer check operation, the vertical and left-right position may be adjusted by returning the transporting unit 80 to a default position, and then whether the switches 92c and 92d or the switches 156h and 158h become ON may be checked.

EXPLANATION OF NUMBERS

10 Medicament dispensing machine
12 Body of the medicament dispensing machine
14a-14 c Vial discharging window
30 Tablet supply unit (medicament filling means)
72 Label printer (Label pasting means)
80 Transporting unit
82, 84 Transporting arms
90 Discharging unit
92 Vial gripping means
92a, 92b Gripping arms
92c, 92d Switches
92e, 92f Gripping rollers (rotating members)
94 Body of gripping means
96 Moving means
96h, 96i Guide piece
98 Orientation changing mechanism
100 Contact piece
102a Engaging groove (first engaging means)
104 Engaging piece (second engaging means)
110 Door
150 Discharging unit
152 Vial gripping means
154 Vial holder
156, 158 Gripping arms
156d Gripping pieces
158i Bent portion

What is claimed is:

1. A gripping device for gripping a vial, comprising:
a pair of arms between which the vial is held; and
a neck holder located a predetermined distance above upper surfaces of said pair of arms, wherein:
the pair of arms grips a body of the vial, and
the neck holder holds at least a part of a neck portion of the vial to prevent the vial from falling through said pair of arms, said neck holder comprises an upward-facing surface that extends in a horizontal direction and engages with a bottom surface of a flange provided in the neck portion of the vial so that the vial is prevented from falling through said pair of arms while the pair of arms are holding the vial upright, and wherein:
the neck holder further comprises an oblique portion connected to a front end of said upward-facing surface, wherein a width of the oblique portion increases gradually from a front-end to a rear-end of said oblique portion, and wherein the oblique portion is sloping upward as it extends from the front-end to the rear-end of said oblique portion.

2. The gripping device of claim 1, wherein the upward-facing surface is located lower than a middle section of the neck holder.

3. The gripping device of claim 1, wherein the neck holder comprises a pair of upward-facing surfaces that extend in a horizontal direction and engage with a bottom surface of a flange provided in the neck portion of the vial so that the vial is prevented from falling through said pair of arms while the pair of arms are holding the vial upright.

4. The gripping device of claim 3, wherein said pair of upward-facing surfaces extend in parallel to one another in a horizontal direction, and
wherein said pair of upward-facing surfaces extend in a direction parallel to a forward-backward orientation of said pair of arms.

5. The gripping device of claim 3, wherein a distance between said pair of upward-facing surfaces is smaller than a distance between said pair of arms.

6. The gripping device of claim 3, wherein the neck holder further comprises a pair of side walls facing an inner space of the neck holder,
wherein a groove extending in a horizontal direction is provided on each of said pair of side walls, and
wherein each of said pair of upward-facing surfaces constitutes at least a part of the groove.

7. The gripping device of claim 6, wherein the pair of upward-facing surfaces are perpendicular to the pair of side walls.

8. The gripping device of claim 6, wherein openings of the grooves face the inner space of the neck holder, and
wherein front ends of the grooves are open to an outer space in front of the neck holder.

9. The gripping device of claim 6, wherein a distance between said pair of side walls at a place lower than the pair of upward-facing surfaces is smaller than at a place higher than said pair of upward-facing surfaces.

10. The gripping device of claim 6, wherein the neck holder further comprises a beam connecting to said pair of side walls, and
wherein the beam is provided at a place higher than said pair of upward-facing surfaces.

11. The gripping device of claim 3, wherein said pair of arms are configured to hold the vial having a polygonal cross-sectional shape, and
wherein a distance between longitudinal ends of the upward-facing surfaces, facing inwardly, is smaller than a distance between two adjacent outer corners of the vial.

12. The gripping device of claim 11, wherein said pair of arms are configured to hold the vial so that one outer edge of the vial faces one of the pair of upward-facing surfaces and one outer corner of the vial faces the other of the pair of upward-facing surfaces.

13. A medicament dispensing machine for filling a vial with medicament, the medicament dispensing machine comprising the gripping device of claim 1 for holding and transporting the vial.

14. A gripping device for gripping a vial, comprising:
a pair of arms between which the vial is held; and a neck holder located a predetermined distance above upper surfaces of said pair of arms, wherein:

the pair of arms grips a body of the vial, and the neck holder holds at least a part of a neck portion of the vial to prevent the vial from falling through said pair of arms, the neck holder further comprises a side wall and a ceiling defining an inner space and an opening at a bottom of the neck holder, and wherein a width of the opening is smaller than a width of the inner space which is located above the opening.

15. The gripping device of claim 14, wherein the side wall and the ceiling further define a side opening in front of the neck holder, connecting the inner space to an outer space.

16. The gripping device of claim 14, wherein the neck holder comprises an upward-facing surface that extends in a horizontal direction and engages with a bottom surface of a flange provided in the neck portion of the vial so that the vial is prevented from falling through said pair of arms while the pair of arms are holding the vial upright.

17. A gripping device for gripping a vial, comprising:

a pair of arms between which the vial is held; and a neck holder located a predetermined distance above upper surfaces of said pair of arms, wherein:

the pair of arms grips a body of the vial, and the neck holder holds at least a part of a neck portion of the vial to prevent the vial from falling through said pair of arms, the gripping device further comprising:

a body of the gripping device to which said pair of arms are coupled; and an eaves which is coupled to the body of the gripping device and is located above said pair of arms, wherein the neck holder is coupled to a bottom portion of the eaves.

18. The gripping device of claim 17, wherein the neckholder comprises a prong, and wherein the neckholder is attached to the bottom portion of the eaves through the prong.

19. The gripping device of claim 17, wherein the pair of arms and the eaves extend parallel to each other and in the same direction from the body of the gripping device.

20. The gripping device of claim 17, wherein the neck holder comprises an upward-facing surface that extends in a horizontal direction and engages with a bottom surface of a flange provided in the neck portion of the vial so that the vial is prevented from falling through said pair of arms while the pair of arms are holding the vial upright.

* * * * *